United States Patent [19]

Inada et al.

[11] Patent Number: 5,534,807
[45] Date of Patent: Jul. 9, 1996

[54] SAMPLING CIRCUIT, PHASE REFERENCE DETECTING CIRCUIT AND SAMPLING CLOCK SHIFTING CIRCUIT

[75] Inventors: Yoshihiro Inada; Shinji Yamashita; Miki Nishimoto, all of Itami, Japan

[73] Assignees: Mitsubishi Electric Semiconductor Software Corporation, Itami; Mitsubishi Denki Kabushiki Kaisha, Tokyo, both of Japan

[21] Appl. No.: 407,652

[22] Filed: Mar. 21, 1995

[30] Foreign Application Priority Data

Jun. 30, 1994 [JP] Japan ................................... 6-149747

[51] Int. Cl.⁶ ........................................................ H03H 11/16
[52] U.S. Cl. .......................... 327/234; 327/91; 327/158; 327/271
[58] Field of Search .................................... 327/155, 158, 327/162, 234, 236, 237, 243, 251, 277, 276, 271, 273, 284, 91

[56] References Cited

U.S. PATENT DOCUMENTS

| | | | |
|---|---|---|---|
| 4,061,977 | 12/1977 | Motley et al. | 327/237 |
| 4,232,399 | 11/1980 | Heiter | 327/237 |
| 4,845,390 | 7/1989 | Chan | 327/278 |
| 4,862,014 | 8/1989 | Myers et al. | 327/237 |
| 5,179,303 | 1/1993 | Searles et al. | 327/277 |
| 5,204,559 | 4/1993 | Deyhimy et al. | 327/232 |
| 5,394,024 | 2/1995 | Buckenmaier et al. | 327/237 |

OTHER PUBLICATIONS

"PLL Applied Technique", pp. 149–150, Shigeharu Takamatsu, Jan. 20, 1989.

*Primary Examiner*—Timothy P. Callahan
*Assistant Examiner*—My-Trang Nu Ton
*Attorney, Agent, or Firm*—Oblon, Spivak, McClelland, Maier & Neustadt

[57] ABSTRACT

A sampling circuit is not susceptible to an influence of structural components and environmental changes. A phase difference detecting circuit (5) detects a deviation of a sampling clock ($\phi 2$) from optimal sampling timing and outputs a phase difference signal. On the other hand, a phase reference signal (ORG) which is used as a reference to determine a phase advance and a phase lag is generated by a phase reference detecting circuit (4). In accordance with these signals, a sampling clock shifting circuit (2) shifts the sampling clock ($\phi 2$) so that the sampling clock ($\phi 2$) is activated at optimal sampling timing. Sampling is performed in accordance with such a sampling clock ($\phi 2$), whereby a basic signal is generated from which the phase reference signal (ORG) and the phase difference signal (i.e., an equivalent signal (EQU) and a non-equivalent signal (UPDN)) are generated. By means of feedback control, the sampling clock is automatically activated at optimal sampling timing.

16 Claims, 22 Drawing Sheets

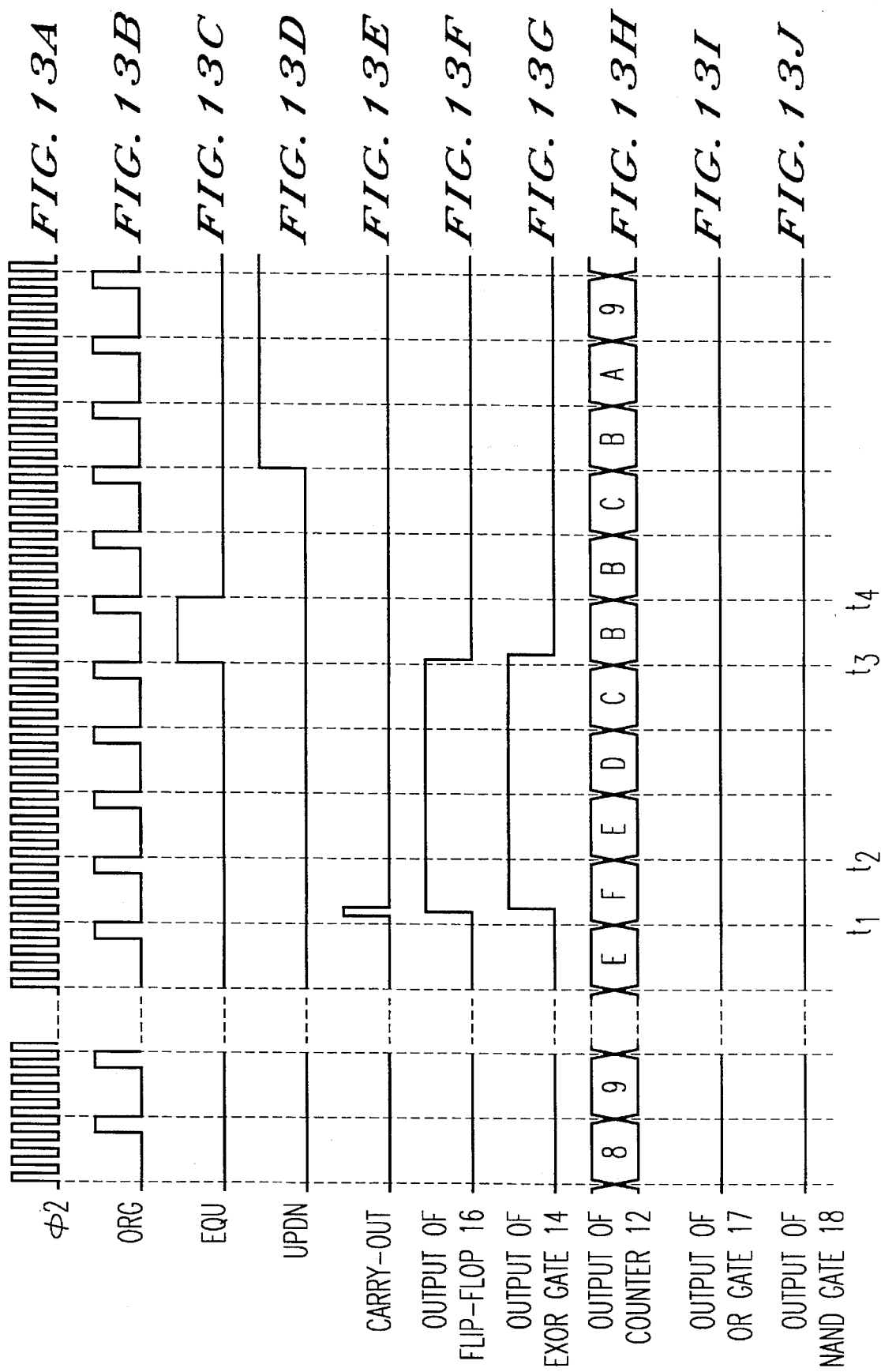

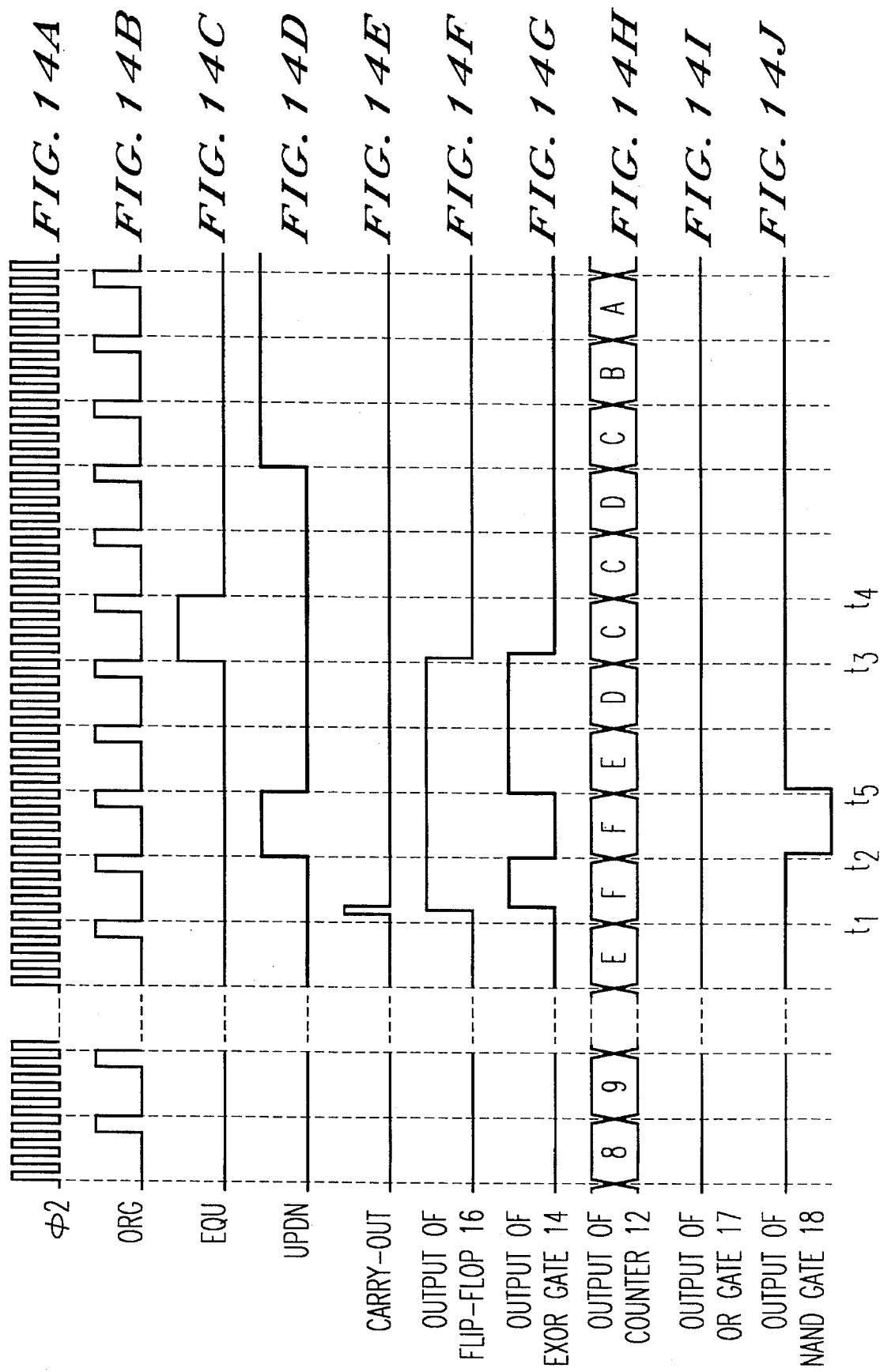

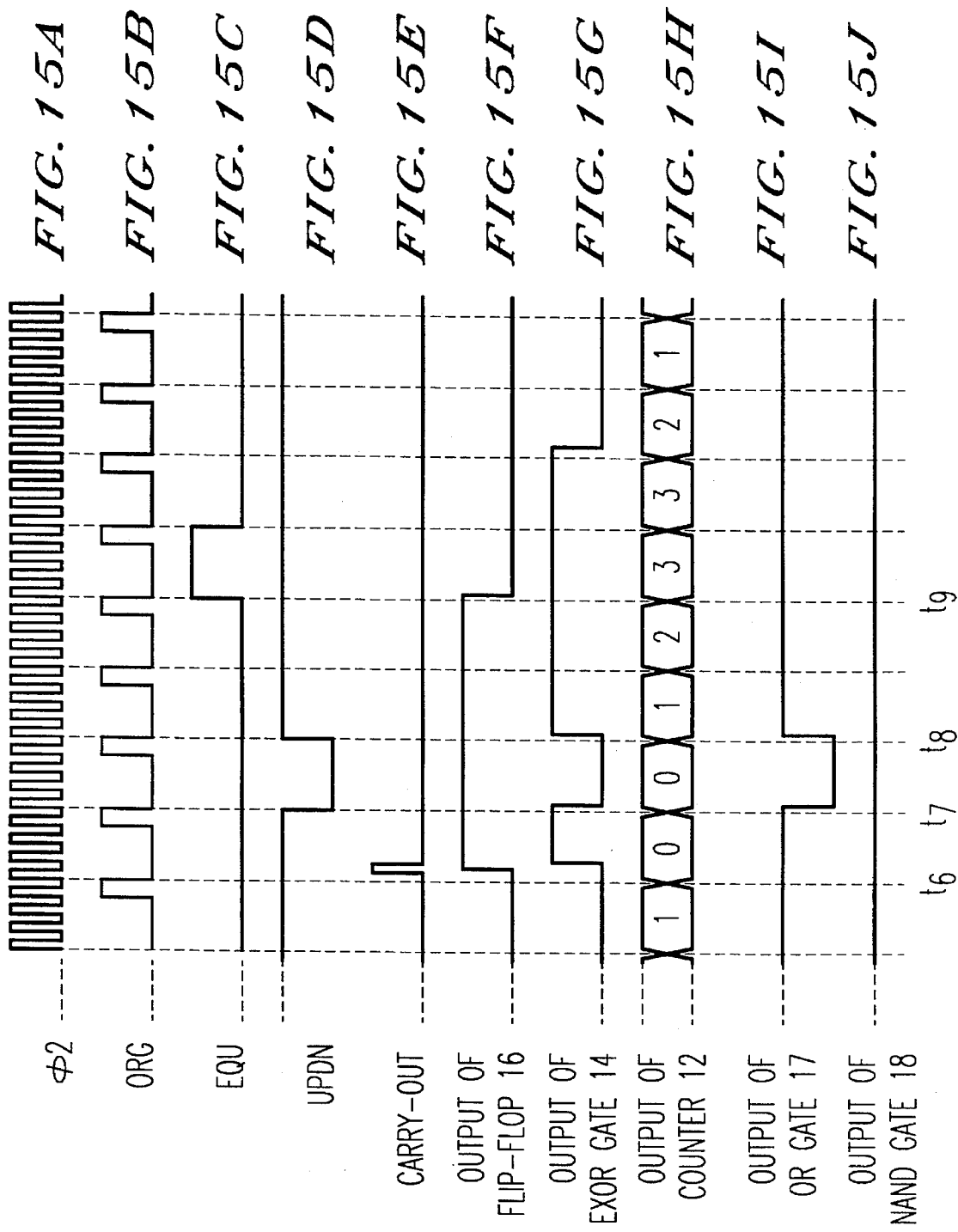

SAMPLING CIRCUIT, PHASE REFERENCE DETECTING CIRCUIT AND SAMPLING CLOCK SHIFTING CIRCUIT

BACKGROUND OF THE INVENTION

1. Field of the Invention

The present invention relates to a sampling circuit, a phase reference detecting circuit and a sampling clock shifting circuit. A phase reference detecting circuit and a sampling clock shifting circuit are used in a sampling circuit. A sampling circuit is used to reproduce and digitalize a color image signal, for example.

2. Description of the Background Art

FIG. 26 is a circuitry diagram showing a structure of a conventional sampling circuit. Resistors 20a, 20b and 20c are connected to an NPN transistor 21a. The operating bias of the NPN transistor 21a is determined by these resistors and power sources $V_{CC}$ and $V_{EE}$. An NPN transistor 21b is also connected to the NPN transistor 21a through a capacitor 19b and a pre-set resistor 22.

A sampling clock received at an input terminal IN is a sinusoidal wave. The capacitor 19a allows only an ac component to be transmitted to a base of the transistor 21a which is biased to a voltage which corresponds to a voltage ratio of the resistors 20a and 20b. From an emitter and a collector of the transistor 21a, two different signals which are shifted by 180° from each other are outputted. One of these signals is supplied to the capacitor 19b and the other is supplied to the pre-set resistor 22. These signals are then synthesized and supplied to a base of the transistor 21b. A synthesized signal has a phase lag which corresponds to a time constant which is defined as a product of a capacitance value of the capacitor 19b and a resistance of the pre-set resistor 22. The transistor 21b and a resistor 20d form an emitter follower circuit which converts an impedance of the synthesized signal. A resultant signal is outputted at an output terminal OUT.

In short, a phase difference of the sampling clock against a signal-to-be-sampled is adjusted by means of the time constant of the resonance circuit which is formed by the capacitor 19b and the pre-set resistor 22. As a result of adjustment of the phase difference of the sampling clock, sampling points are adjusted.

Having such a structure as above, the conventional sampling circuit is susceptible to an influence of the structural components such as the resistors, the capacitor and the transistors, as well as an environmental temperature, a fluctuation in a power source voltage and other factors. To a further disadvantage, it is impossible to automatize adjustment since feedback control is impossible.

SUMMARY OF THE INVENTION

A first aspect of the present invention is related to a sampling circuit for sampling an analog signal-to-be-sampled using a sampling clock, the signal-to-be-sampled including a primary signal which is obtained by demodulating a carrier and a fore signal which has the same frequency as the carrier and which is precedent to the primary signal, the sampling clock having a frequency which is m times as high as the frequency of the carrier (m is an integer). The sampling circuit comprises: (a) an A/D converter for sampling the signal-to-be-sampled in accordance with the sampling clock and generating a digital basic signal; (b) a phase reference detecting circuit for generating at least three delayed basic signals having different phases from each other and being obtained by delaying the basic signal in synchronism with the sampling clock, and a phase difference signal which indicates a reference of a phase of said sampling clock; (c) a phase difference detecting circuit for generating a phase difference signal from the delayed basic signals, the phase difference signal indicating a phase difference between the fore signal and the basic signal when the phase reference signal is active; and (d) a sampling clock shifting circuit for shifting the phase of the sampling clock in accordance with the phase difference signal only when the phase reference signal is active, to thereby supply the sampling clock to the A/D converter and the phase reference detecting circuit.

According to a second aspect of the present invention, in the sampling circuit of the first aspect, the phase reference signal is activated during one cycle of the sampling clock which starts from a time of activation of the sampling clock within a range of ½m cycle from a mid value of the fore signal toward both a prior time and a future time.

According to a third aspect of the present invention, in the sampling circuit of the second aspect, the integer m is 4, and the phase reference detecting circuit includes: (b-1) first signal transmitting means having an input terminal for receiving the basic signal and an output terminal for transmitting a signal which is received at the input terminal in response to activation of the sampling clock as a first delayed basic signal of the delayed basic signals; (b-2) second signal transmitting means having an input terminal for receiving the first delayed basic signal and output terminal for transmitting a signal which is supplied to the input terminal of the second signal transmitting means in response to activation of the sampling clock as a second delayed basic signal of the delayed basic signals; (b-3) third signal transmitting means having an input terminal for receiving the second delayed basic signal and an output terminal for transmitting a signal which is supplied to the input terminal of the third signal transmitting means in response to activation of the sampling clock as a third delayed basic signal of the delayed basic signals; (b-4) fourth signal transmitting means having an input terminal for receiving the third delayed basic signal and an output terminal for transmitting a signal which is supplied to the input terminal of the fourth signal transmitting means in response to activation of the sampling clock as a fourth delayed basic signal of the delayed basic signals; and (b-5) a comparator for outputting the phase reference signal which is activated when the first delayed basic signal is smaller than the fourth delayed basic signal and is equal to or smaller than the second delayed basic signal during the specified one cycle of the fore signal.

Alternatively, in the third aspect of the present invention, the integer m is 4, and the phase reference detecting circuit includes: (b-1) first signal transmitting means having an input terminal for receiving the basic signal and an output terminal for transmitting a signal which is received at the input terminal in response to activation of the sampling clock as a first delayed basic signal of the delayed basic signals; (b-2) second signal transmitting means having an input terminal for receiving the first delayed basic signal and an output terminal for transmitting a signal which is supplied to the input terminal of the second signal transmitting means in response to activation of the sampling clock as a second delayed basic signal of the delayed basic signals; (b-3) third signal transmitting means having an input terminal for receiving the second delayed basic signal and an output terminal for transmitting a signal which is supplied to the input terminal of the third signal transmitting means in response to activation of the sampling clock as a third delayed basic signal of the delayed basic signals; (b-4) fourth signal transmitting means having an input terminal for receiving the third delayed basic signal and an output terminal for transmitting a signal which is supplied to the input terminal of the fourth signal transmitting means in response to activation of the sampling clock as a fourth delayed basic signal of the delayed basic signals; and (b-5) a comparator for outputting the phase reference signal which is activated when the fourth delayed basic signal is larger than the first delayed basic signal and is equal to or smaller than the third delayed basic signal during the specified one cycle of the fore signal.

Alternatively, the integer m is 4, and the phase reference detecting circuit includes: (b-1) first signal transmitting means having an input terminal for receiving the basic signal and an output terminal for transmitting a signal which is received at the input terminal in response to activation of the sampling clock as a first delayed basic signal of the delayed basic signals; (b-2) second signal transmitting means having an input terminal for receiving the first delayed basic signal and an output terminal for transmitting a signal which is supplied to the input terminal of the second signal transmitting means in response to activation of the sampling clock as a second delayed basic signal of the delayed basic signals; (b-3) third signal transmitting means having an input terminal for receiving the second delayed basic signal and an output terminal for transmitting a signal which is supplied to the input terminal of the third signal transmitting means in response to activation of the sampling clock as a third delayed basic signal of the delayed basic signals; and (b-4) a first comparator for outputting the phase reference signal which is activated when the second delayed basic signal is larger than the first delayed basic signal and the third delayed basic signal is equal to or smaller than the second delayed basic signal during the specified one cycle of the fore signal.

According to a fourth aspect of the present invention, in the sampling circuit of the third aspect, the phase difference detecting circuit includes (c-1) a second comparator for comparing the third and the first delayed basic signals and for outputting an equivalent signal which is activated when the third and the first delayed basic signals are equal to each other and a non-equivalent signal which is activated when the third delayed basic signal is larger than the first delayed basic signal, and the equivalent signal and the non-equivalent signal form the phase difference signal.

According to a fifth aspect of the present invention, in the sampling circuit of the third aspect, the phase difference detecting circuit includes: (c-1) a second comparator for outputting an equivalent signal which is activated when the third and the second delayed basic signals are equal to each other; and (c-2) a third comparator for outputting a non-equivalent signal which is activated when the third delayed basic signal is equal to or larger than the first delayed basic signal, and the equivalent signal and the non-equivalent signal form the phase difference signal.

According to a sixth aspect of the present invention, in the sampling circuit of the second aspect, the phase difference signal is formed by an equivalent signal which is activated when the signal-to-be-sampled is sampled at an optimal timing and a non-equivalent signal which indicates, during activation of the phase reference signal, that the activation expresses a timing delay of sampling. The sampling clock shifting circuit includes: (d-1) delaying means for receiving a shifting control signal and the sampling clock and delaying the sampling clock in accordance with the shifting control signal; (d-2) a counter for counting the sampling clock which is delayed by the delaying means and generating the shifting control signal, a direction in which the counter counts being determined by the non-equivalent signal; and (d-3) counter operation allowing means for allowing the counter to count only when the non-equivalent signal is not active but the phase reference signal is active.

In the sixth aspect of the present invention, the delaying means may include: (d-1-1) a plurality of delaying elements which are, serially connected to each other; (d-1-2) the same number of input terminals as the plurality of the delaying elements, each receiving an output of an associated one of the delaying elements; and (d-1-3) a selector for selectively outputting one of data supplied to the input terminals in accordance with the shifting control signal.

In the sixth aspect of the present invention, the counter may include (d-2-1) an enable terminal for controlling an operation of the counter, and the counter operation allowing means may include: (d-3-1) an inverter for reversing the equivalent signal; and (d-3-2) a logic element having an input terminal for receiving an output of the inverter and the phase reference signal and an output terminal for outputting a logical product which is obtained at the input terminal of the logic element, the output terminal of the logic element being connected to the enable terminal.

According to a seventh aspect of the present invention, in the sampling circuit of the sixth aspect, the sampling clock shifting circuit further includes (d-4) counting direction reversing means for reversing a counting direction when the counter registers a maximum count or a minimum count.

In the seventh aspect of the present invention, the counter outputs a carry-out signal which is activated when the counter registers the maximum count or the minimum count, and the counting direction reversing means includes: (d-4-1) a flip-flop for outputting a reversing control signal which is set by the carry-out signal and reset by the equivalent signal; and (d-4-2) a logic element for transmitting the non-equivalent signal in response to deactivation of the reversing control signal and for reversing and transmitting the non-equivalent signal in response to activation of the reversing control signal.

According to an eighth aspect of the present invention, in the sampling circuit of the seventh aspect, the delaying means shifts the sampling clock within a range of 3/8 cycle of the fore signal.

According to a ninth aspect of the present invention, in the sampling circuit of the seventh aspect, the sampling clock shifting circuit further includes (d-5) counting stopping means for prohibiting counting up when the counter registers the maximum count and prohibiting counting down when the counter registers the minimum count.

A tenth aspect of the present invention is related to a phase reference detecting circuit for finding a basic signal which is obtained by sampling a signal-to-be-sampled in accordance with a sampling clock which is activated at intervals of 1/4 cycle of the signal-to-be-sampled and for outputting a phase reference signal which serves as a reference to determine whether the signal-to-be-sampled is sampled with a predetermined phase and which is activated in response to the basic signal, the phase reference detecting circuit comprising: (a) first signal transmitting means having an input terminal for receiving the basic signal and an output terminal for transmitting a signal which is received at the input terminal in response to activation of the sampling clock, the signal from the output terminal being outputted as a first delayed basic signal of the delayed basic signals; (b) second signal transmitting means having an input terminal for receiving the first delayed basic signal and an output terminal for transmitting a signal which is supplied to the input terminal of the second signal transmitting means in response to activation of the sampling clock, the signal from the output terminal being outputted as a second delayed basic signal of the delayed basic signals; (c) third signal transmitting means having an input terminal for receiving the second delayed basic signal and an output terminal for transmitting a signal which is supplied to the input terminal of the third signal transmitting means in response to activation of the sampling clock, the signal from the output terminal being outputted as a third delayed basic signal of the delayed basic signals; and (d) a first comparator for outputting the phase reference signal which is activated when the second delayed basic signal is larger than the first delayed basic signal and the third delayed basic signal is equal to or smaller than the second delayed basic signal during the specified one cycle of the fore signal.

An eleventh aspect of the present invention is related to a sampling clock shifting circuit for shifting a phase of a sampling clock during sampling of a signal-to-be-sampled in accordance with the sampling clock which is activated at intervals of ¼ cycle of the signal-to-be-sampled in such a manner that the signal-to-be-sampled is sampled with a predetermined phase, the sampling clock shifting circuit receiving: (x-1) a coincidence signal which indicates whether a phase of the sampling clock is deviated from the predetermined phase; (x-2) a phase reference signal which expresses a deviation between the phase of the sampling clock and the predetermined phase; and (x-3) a non-coincidence signal which expresses a direction of the deviation between the phase of the sampling clock and the predetermined phase when the phase reference signal is active. The sampling clock shifting circuit comprises: (a) delaying means for receiving a shifting control signal and the sampling clock and &laying the sampling clock in accordance with the shifting control signal; (b) a counter for counting the sampling clock which is delayed by the delaying means and generating the shifting control signal, a direction in which the counter counts being determined by the non-coincidence signal; and (c) counter operation allowing means for allowing the counter to count only when the coincident signal is not active but the phase reference signal is active.

In the sampling circuit of the first aspect, when the phase of the sampling clock does not have a proper phase difference with respect to the phase of the signal-to-be-sampled, the sampling clock shifting circuit shifts the phase of the sampling clock. Whether the phase difference has a proper amount is detected by the phase difference detecting circuit in accordance with the basic signal which is obtained by digitalizing the signal-to-be-sampled using the sampling clock. Hence, the phase of the sampling clock is adjusted utilizing a feedback regarding the same.

Only when combined with the phase reference which is provided by the phase reference detecting circuit, the phase difference signal outputted by the phase difference detecting circuit serves as valid information useful for shifting the phase of the sampling clock. For this reason, the sampling clock shifting circuit shifts the phase of the sampling clock in accordance with the phase difference signal only when the phase reference signal is active. Such correction of the phase of the sampling clock is performed during a specified one cycle of the fore signal.

In the sampling circuit of the second aspect, the phase reference signal is activated within a predetermined cycle of the fore signal. Since the predetermined cycle is 1/m cycle, the sampling clock is always active within this cycle, and therefore, there is always the basic signal which is obtained by sampling the fore signal.

In the sampling circuit of the third aspect, the signal-to-be-sampled is sampled at the sampling clock which has a frequency four times as high as that of the signal-to-be-sampled. Hence, it is possible to obtain the delayed basic signals, which are compared with each other, from the respective output terminals of the first to the third signal transmitting means which are serially connected in this order.

In the sampling circuit of the fourth aspect, the equivalent signal is activated, regarding sampling at a time when the fore signal records its mid value as an optimal sampling timing. During activation of the phase reference signal, when the third delayed basic signal is larger than the first delayed basic signal, the non-equivalent signal indicates that sampling timing is lagged behind the optimum sampling timing.

In the sampling circuit of the fifth aspect, the equivalent signal is activated, regarding sampling at a time which is deviated by ⅛ cycle of the fore signal from the time of the mid value of the fore signal as an optimal sampling timing. During activation of the phase reference signal, when the third delayed basic signal is equal to or smaller than the first delayed basic signal, the non-equivalent signal indicates that sampling timing is lagged behind the optimum sampling timing.

In the sampling circuit of the sixth aspect, since the counter operates under the control of the counter operation allowing means, by means of the non-equivalent signal, it is possible to change the counting direction of the counter in accordance with an advance or a delay of sampling timing in such a manner that the sampling timing becomes optimum. A result of the counting of the counter controls a delay of the sampling clock as the shifting control signal.

In the sampling circuit of the seventh aspect, in a case where the non-equivalent signal stays at the same value, when the counter registers a maximum count or a minimum count, it is judged that no more shifting of the sampling clock in the current counting direction will not optimize the sampling timing. Following this, the sampling clock is shifted in the reverse direction to optimize the sampling timing. Sampling is always performed during a period from ⅛ cycle of the fore signal leading the optimal sampling timing until ⅛ cycle of the fore signal after the optimal sampling timing. Hence, where the sampling timing leads the optimal sampling timing, by delaying the sampling clock by at most ¼ cycle of the fore signal, the basic signal is obtained as it should be by sampling which is timed at the optimal sampling timing. To the contrary, where the sampling timing is lagged behind the optimal sampling timing, the sampling clock is advanced by at most ¼ cycle of the fore signal.

In the sampling circuit of the eighth aspect, it is possible to shift by ¼ cycle of the fore signal for sampling which is timed any timing and for shifting of the sampling clock in any direction.

In the sampling circuit of the ninth aspect, the counting direction of the counter is switched by the counting direction reversing means when the counter registers a maximum count. Hence, the counter does not perform counting even if the sampling clock shifting circuit is instructed to initiate counting.

In the phase reference detecting circuit of the tenth aspect, since the serially sampled basic signals are compared with each other, it is possible to obtain the first to the third delayed basic signals from the respective output terminals of the first to the third signal transmitting means.

In the sampling clock shifting circuit of the eleventh aspect, since the counter operates under the control of the counter operation allowing means, by means of the non-coincident signal, it is possible to change the counting direction of the counter in accordance with an advance or a delay of sampling timing in such a manner that the sampling timing becomes optimum. Since it is only when the phase reference signal is active that the non-coincident signal correctly expresses the direction of a deviation of the phase of the sampling clock with respect to the predetermined phase, the operation of the counter of when the phase reference signal is inactive is stopped by the counter operation allowing means.

As heretofore described, according to the present invention, by means of feedback control of the sampling circuit utilizing a digital circuit, various effects are created such as a reduction in the number of discrete components, automatized adjustment and various modes of control.

In the sampling circuit of the first aspect, the phase of the sampling clock is adjusted utilizing a feedback regarding the same. Further, since the phase of the sampling clock is corrected within the specified one cycle of the fore signal, it is possible to automatically adjust the phase of the sampling clock such that a phase difference of the sampling clock with respect to the primary signal which is supplied later has a proper amount.

In the sampling circuit of the second aspect, it is possible to generate the phase reference signal in an easy manner only by comparing the values of the delayed basic signals.

In the sampling circuit of the third aspect, it is possible to generate the phase reference signal with a simple structure.

In the sampling circuit of the fourth aspect, it is possible to detect whether the sampling timing is optimal by means of the equivalent signal. Particularly during activation of the phase reference signal, whether the sampling timing is later is judged by means of the non-equivalent signal.

Since sampling at a time when the fore signal records its mid value is judged as an optimal sampling timing, the fourth aspect of the present invention is suitable especially to sampling of a color signal of the NTSC method.

In the sampling circuit of the fifth aspect, it is possible to detect whether the sampling timing is optimal by means of the equivalent signal. Particularly during activation of the phase reference signal, whether the sampling timing is later is judged by means of the non-equivalent signal.

Since sampling at a time which is deviated by ⅛ cycle of the fore signal from the time of the mid value of the fore signal is judged as an optimal sampling timing, the fifth aspect of the present invention is suitable especially to sampling of a color signal of the PAL method.

In the sampling circuit of the sixth aspect, it is possible to optimize the sampling timing by delaying the sampling clock.

In the sampling circuit of the seventh aspect, the sampling clock may be shifted only by at least ¼ cycle of the fore signal regardless of whether the sampling timing leads or lags behind the optimal sampling timing.

In the sampling circuit of the eighth aspect, it is possible to reduce the shifting amount of the sampling clock to optimize the sampling timing, and therefore, it is possible to adjust the sampling clock so that sampling is smoothly and optimally performed.

In the sampling circuit of the ninth aspect, the sampling clock shifting circuit receives an instruction for counting up from outside immediately before the counter registers a maximum count. Since an instruction for counting down is supplied after this, it is judged that the optimal sampling timing approximately coincides with the activation of the sampling clock. Hence, there is no need to further shift the sampling clock. In other words, unnecessary malfunction due to the counting direction reversing means is avoided.

In the phase reference detecting circuit of the tenth aspect, it is possible to generate the phase reference signal with a simple structure.

In the sampling clock shifting circuit of the eleventh aspect, it is possible to optimize the sampling timing by delaying the sampling clock.

Accordingly, it is an object of the present invention to obtain a sampling circuit in which a sampling clock is automatically activated at an optimal timing by means of feedback control and hence which is not susceptible to an influence of structural components, an environmental temperature, a fluctuation in a power source voltage and other factors.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 13 to 15 are timing charts showing waveforms of signals in the first preferred embodiment;

DESCRIPTION OF THE PREFERRED EMBODIMENTS

A. Background Technique

Figure 1A:
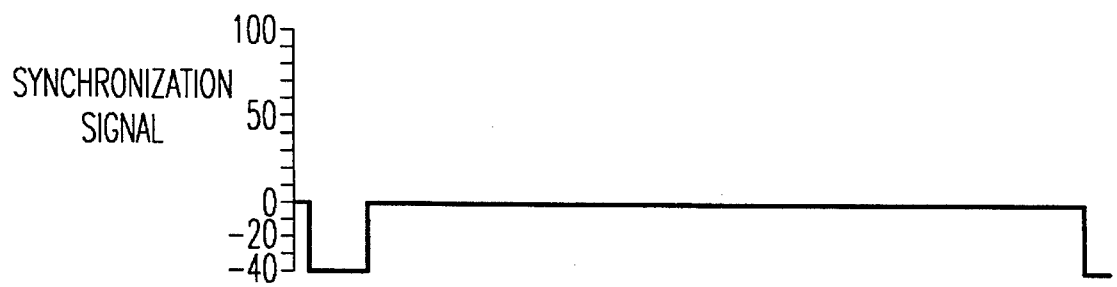
FIG. 1 is a waveform diagram schematically showing a construction of a color image signal to which the present invention is applicable.
Figure 1B:
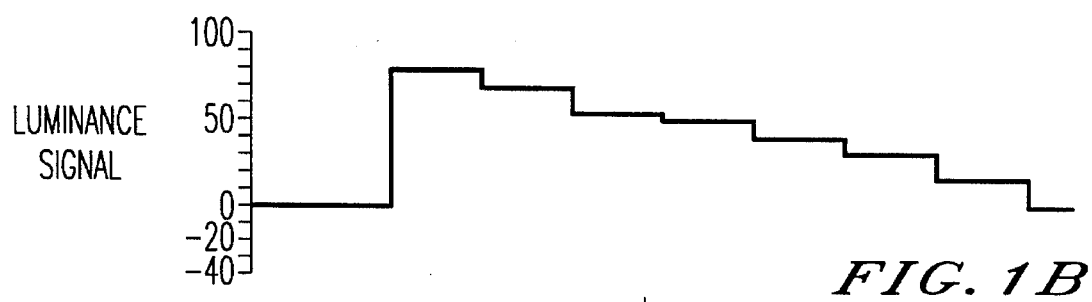
Figure 1C:
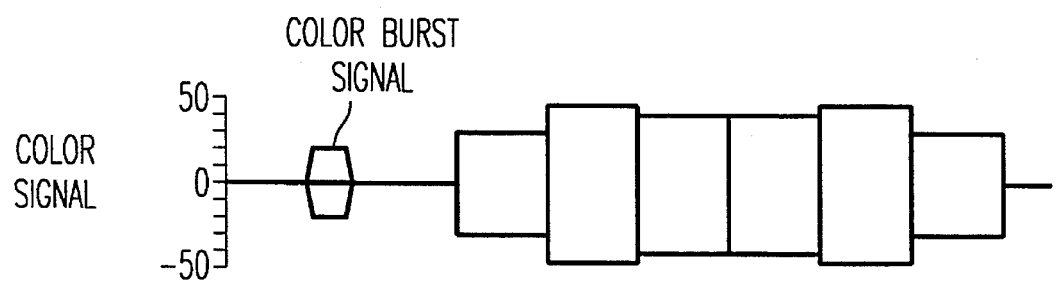
Figure 1D:
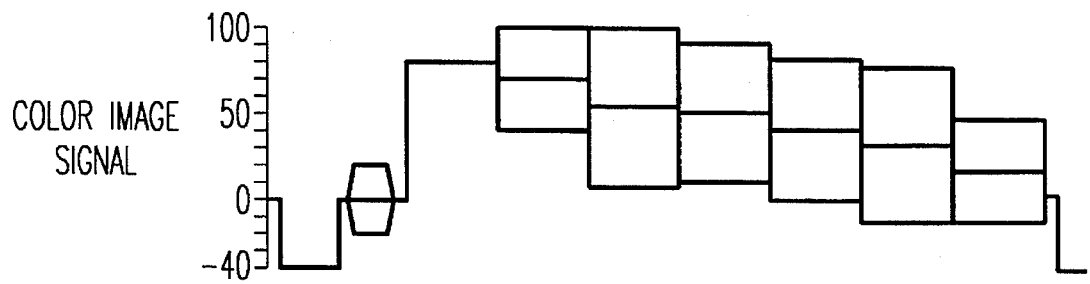

For a better understanding of the present invention, a method of reproducing a color image signal to which the present invention is applied will be described before describing preferred embodiments of the present invention.

FIG. 1 is a waveform diagram schematically showing a construction of a color image signal. The color image signal is obtained by synthesizing a synchronization signal, a color signal and a luminance signal. Receiving a color image signal, a receiver unit separates the color image signal into a synchronization signal, a color signal and a luminance signal, and processes these signals by demodulation or other treatments.

The present invention is related in particular to a technique of processing a color image signal. A color image signal E, which is obtained by modulating a chrominance subcarrier $f_{sc}$ by two color-difference signals I and Q by quadrature two phase modulation, is modulated with a luminance signal Y in a frequency multiplexing manner as can be seen in Eq. 1. For instance, the chrominance subcarrier $f_{sc}$ is set at $455/2 \cdot f_H = 3.579545$ MHz while the color-difference signals I and Q are set to have a bandwidth of 1.5 MHz and a bandwidth of 0.5 MHz, respectively.

$$\begin{aligned} E &= Y + I\cos(2\pi f_{sc}t + 33°) + Q\sin(2\pi f_{sc}t + 33°) \\ &= Y + 0.493(B-Y)\sin 2\pi f_{sc}t + 0.877(R-Y)\cos 2\pi f_{sc}t \end{aligned}$$

where the symbol B-Y represents a color-difference signal for blue and the symbol R-Y represents a color-difference signal for red.

When a color signal included in the color image signal E in which a plurality of signals are multiplexing-modulated is to be directly digitalized (i.e., before demodulating), to make it easy to separate the color image signal E into the two color-difference signals I and Q by demodulating the color image signal E with respect to the two color-difference signals I and Q, in most cases, the chrominance subcarrier $f_{sc}$ multiplied by an integer, i.e., $f_{samp} = m \cdot f_{sc}$ (m: integer) is selected as a sampling frequency $f_{samp}$ of a sampling clock which is used for digitalization. To satisfy the sampling theorem, m>2 should hold. However, in general, the chrominance subcarrier $f_{sc}$ is set with m=4 satisfied for ease of separation and synthesizing, for ease of processing between scanning lines and between flames, and for ease of physical design of a pre-filter and a post-filter.

Phases of the color-difference signals I and Q with respect to chrominance subcarrier determine a color phase. Hence, in digitalizing a color signal, it is necessary to optimize not only the sampling frequency but also the phase of a sampling clock.

The reason can be readily understood by considering a case where a color signal is digitalized with the phase of a sampling clock deviated from an optimum phase. When data obtained by digitalization is demodulated and separated into two color-difference signals, each color-difference signal includes a component of the other color-difference signal which manifests itself as a distorted color phase. Such residual components are created due to a deviation of the sampling phase. Hence, to prevent distortion in a color phase, the phase of the sampling clock with respect to the sampling clock must be optimized.

The present invention utilizes a fact that besides the component which is expressed by Eq. 1, the color signal includes a color burst signal which is a fore signal which appears prior to the component which is expressed by Eq. 1 as shown in FIG. 1. In other words, the point of the present invention is to optimize the phase of the sampling clock with respect to the color burst signal and to thereafter digitalize a primary portion of the color signal which appears after the color burst signal by using such an optimized sampling clock.

B. First Preferred Embodiment

(b-1) Outline of Structure and Operation

Figure 2:
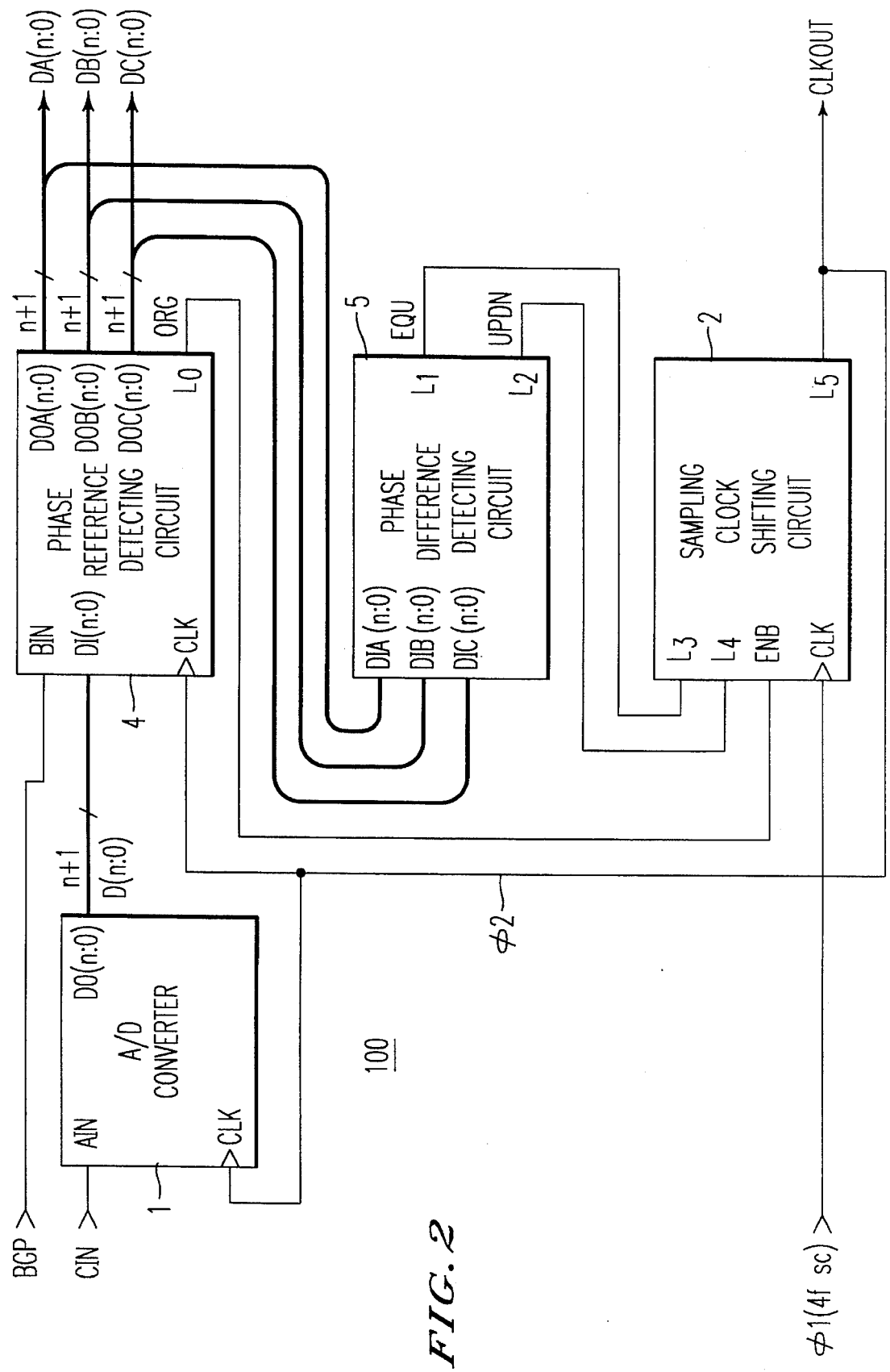
FIG. 2 is a circuitry diagram showing a structure of a sampling circuit according to a first preferred embodiment of the present invention.

FIG. 2 is a circuitry diagram showing a structure of a sampling circuit 100 according to a first preferred embodiment of the present invention. The sampling circuit 100 comprises an A/D converter 1, a phase reference detecting circuit 4, a phase difference detecting circuit 5 and a sampling clock shifting circuit 2.

The A/D converter 1 performs sampling at a timing when a sampling clock $\phi_2$ is activated so that a color signal supplied to the A/D converter 1 is A/D converted into a basic signal $D_{<n:0>}$. The sampling clock $\phi_2$ used here is shifted by the sampling clock shifting circuit 2 so as to be activated at an optimum time during the sampling.

To shift the sampling clock shifting circuit 2 in such a manner, it is necessary to detect a deviation of the phase of the sampling clock $\phi_2$ from the optimum timing. To this end, the phase difference detecting circuit 5 supplies an equivalent signal EQU and a non-equivalent signal UPDN which form a phase difference signal to the sampling clock shifting circuit 2 so that the sampling clock shifting circuit 2 is provided with information regarding the deviation of the phase. It is to be noted, however, that the equivalent signal EQU and the non-equivalent signal UPDN do not always have valid information.

To detect a phase difference between the color signal and the sampling clock $\phi_2$, it is necessary to define a base time of the sampling clock $\phi_2$. Since the sampling clock $\phi_2$ is activated cyclically again and again, the sampling clock $\phi_2$ may lead the color signal at some point but may be lagged behind at some other point. For this reason, the phase difference cannot be known unless the base time is determined.

To determine the base time, the phase reference detecting circuit 4 generates a phase reference signal ORG and supplies the same to the sampling clock shifting circuit 2. Since the phase reference signal ORG is referred to, the information regarding the phase difference contained in the equivalent signal EQU and the non-equivalent signal UPDN becomes valid.

The phase reference detecting circuit 4 delays the basic signal $D_{<a:0>}$ into at least three delayed basic signals which have different phases from each other. From these delayed basic signals, the phase reference detecting circuit 4 generates the phase reference signal ORG in accordance with a predetermined rule.

Thus, since a feedback regarding the phase; of the sampling clock $\phi_2$ is utilized, it is possible to automatically sample the color signal at an optimum timing.

(b-2) Details of Structural Components Regarding Structure and Operation

The color signal of the image signal is supplied to an input terminal CIN which is connected to an analog input terminal AIN of the A/D converter 1. The A/D converter 1 samples an analog signal which is received at the analog input terminal AIN at a timing of the sampling clock $\phi_2$ which is supplied to a clock terminal CLK. As a result of the sampling, the digital (n+1)-bit basic signal $D_{<n:0>}$ is obtained from the color signal. The basic signal $D_{<n:0>}$ is outputted at an (n+1)-bit output terminal $DO_{<n:0>}$.

The phase reference detecting circuit 4 receives a burst gate pulse BGP which will be described later through an input terminal BIN and the basic signal $D_{<n:0>}$ through an (n+1)-bit input terminal $DI_{<n:0>}$. The sampling clock $\phi_2$ is supplied to the clock terminal CLK. The basic signal $D_{<n:0>}$ is delayed at timing when the sampling clock $\phi_2$ is activated, whereby three delayed basic signals $DA_{<n:0>}$, $DB_{<n:0>}$ and $DC_{<n:0>}$ are generated which are, outputted respectively at output terminals $DOA_{<n:0>}$, $DOB_{<n:0>}$ and $DOC_{<n:0>}$. The reason for generating the three delayed basic signals $DA_{<n:0>}$, $DB_{<n:0>}$ and $DC_{<n:0>}$ is to make it possible to compare the values of serially sampled basic signals with each other at the same time. The phase reference signal ORG is outputted at an output terminal $L_0$.

Figure 3A:
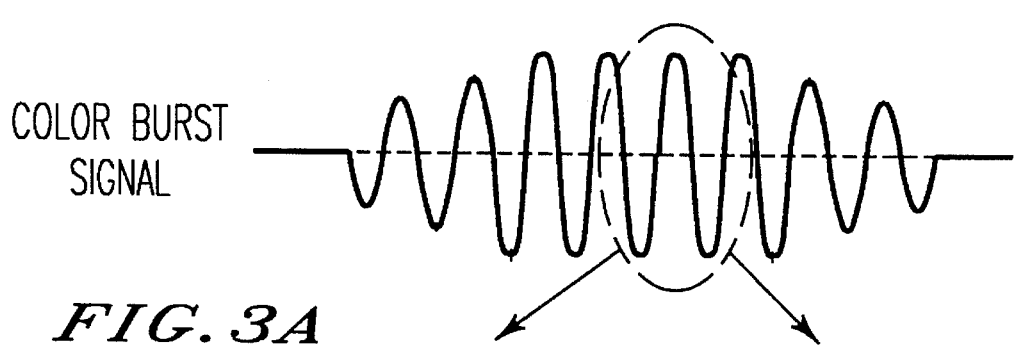
FIG. 3 is a waveform diagram of a waveform of a burst gate pulse.
Figure 3B:
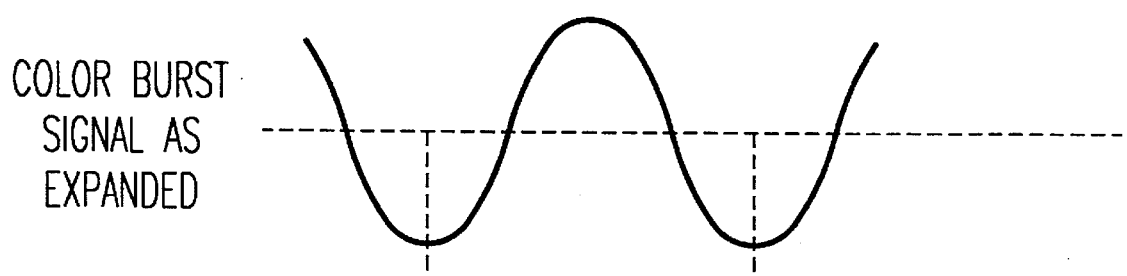
Figure 3C:
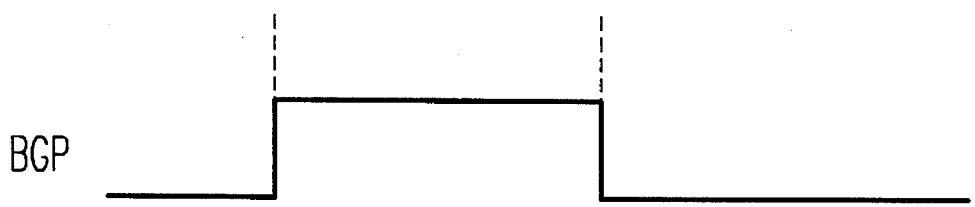

FIG. 3 is a waveform diagram of a waveform of the burst gate pulse BGP. The burst gate pulse BGP is a pulse signal which is activated to coincide with one cycle of an intermediate portion of the color burst signal of the color signal during a vertical retrace line interval. In the present invention, a primary portion of the color signal is optimally sampled by optimally adjusting the phase of the sampling clock to the burst signal. Such sampling is possible because the primary portion of the color signal is modulated by a carrier which is the same as the burst signal.

In other words, the phase difference of the sampling clock with respect to the burst signal is detected during the vertical retrace line interval. A premise is that the burst gate pulse BGP rises to "H" level when activated.

Figure 4:
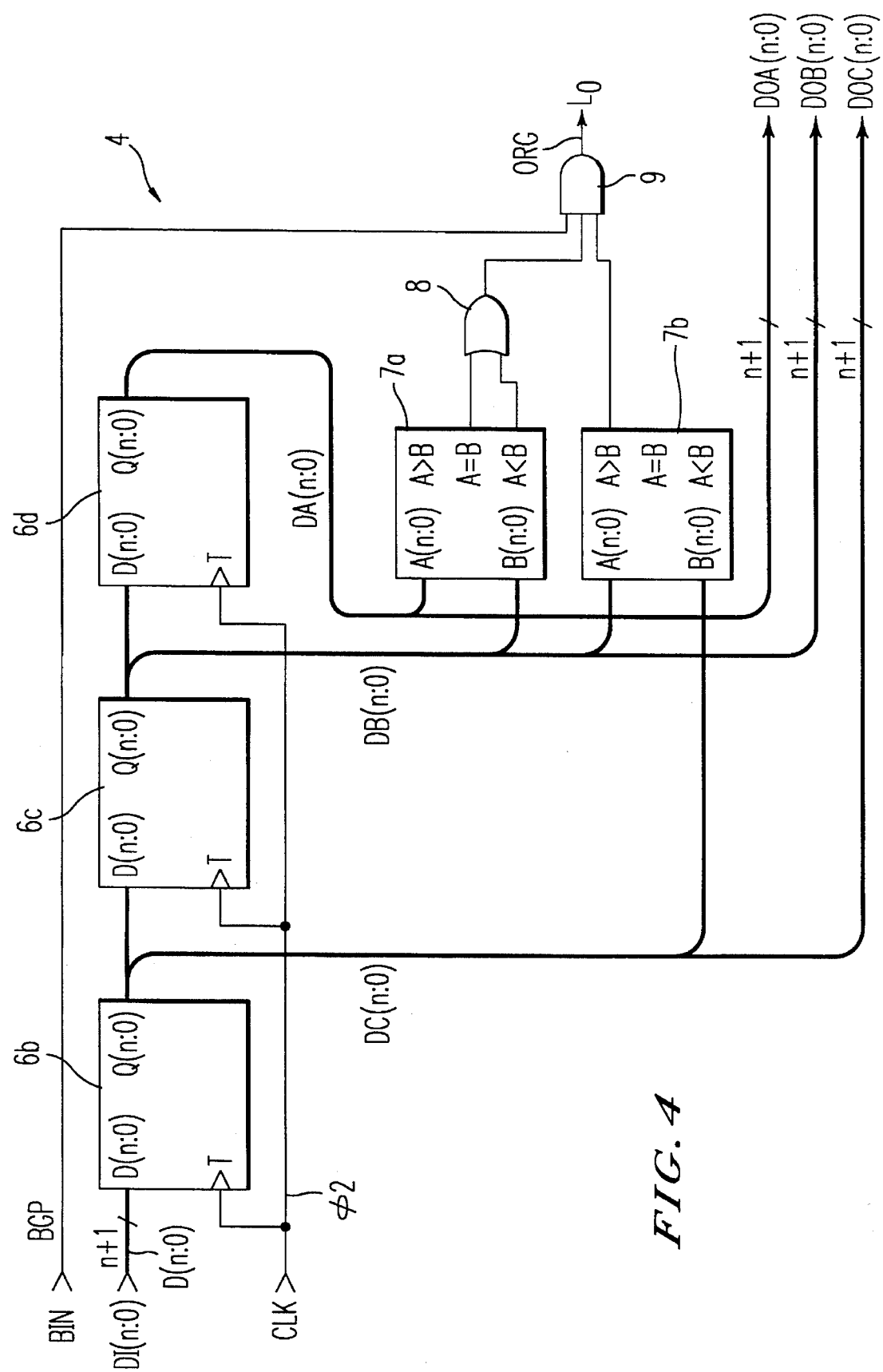
FIG. 4 is a circuitry diagram showing an example of a structure of a phase reference detecting circuit.

FIG. 4 is a circuitry diagram showing an example of a structure of the phase reference detecting circuit 4. The phase reference detecting circuit 4 comprises (n+1)-bit D-type flip-flops 6b, 6c and 6d which are serially connected to each other, (n+1)-bit magnitude comparators 7a and 7b, an OR gate 8 and an AND gate 9. The D-type flip-flops 6b, 6c and 6d each include a D-input terminal, a Q-output terminal and a T-input terminal. When a signal supplied to the T-input terminal is activated, each D-type flip-flop transmits data which is supplied to the D-input terminal to the Q-output terminal. The D-input terminal of the D-type flip-flop 6b is connected to the input terminal $DI_{>n:0>}$ so as to receive the basic signal $D_{<n:0>}$. On the other hand, the T-input terminals of all of the D-type flip-flops 6b, 6c and 6d are connected to the clock terminal CLK so as to receive the sampling clock $\phi_2$. Hence, respectively from the Q-input terminals of the D-type flip-flops 6b, 6c and 6d, a first delayed basic signal $DC_{<n:0>}$, a second delayed basic signal $DB_{<n:0>}$ and a third delayed basic signal $DA_{<n:0>}$ which have progressively shorter delay times are outputted. Although equally being a basic signal, these three delayed basic signals are sampled at different sampling timing. The phase reference signal ORG is obtained by comparing the values of these delayed basic signals in accordance with a predetermined rule which will be described below.

A case where the frequency of the sampling clock $\phi_2$ is four times higher than the frequency of a carrier of a color signal will be described as an example as in Description of the Background Art. In this case, even if a quarter of the cycle of the burst signal is set at an optional time, there is always a sampling time during that quarter cycle. However, to detect a phase difference by comparing the values of the sampled basic signals, the values and the phases of the basic signals must correspond to each other among the basic signals;. Hence, the quarter cycle to be considered to generate the phase reference signal ORG can be defined around a time at which the burst signal has its mid value.

FIGS. 5 to 8 are waveform diagrams of the burst signal for explaining the predetermined rule to be followed in generating the phase reference signal ORG. In FIGS. 5 to 8, denoted at reference character L is a quarter cycle which expands around the point of the mid value of the burst signal and during which the burst signal monotonously increases. Here, for convenience of description, the point of the mid value of the burst signal during the period L is $\theta=0°$ and one cycle of the burst signal is 360°, in which case the period L is defined as a period when $\theta=-45°$ $-45°$ holds.

Figure 5:
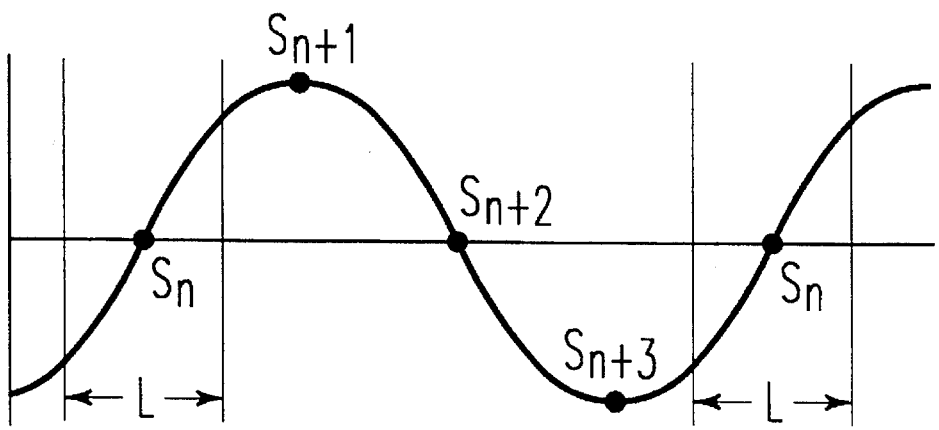
FIGS. 5 to 8 are waveform diagrams of a burst signal.
Figure 6:
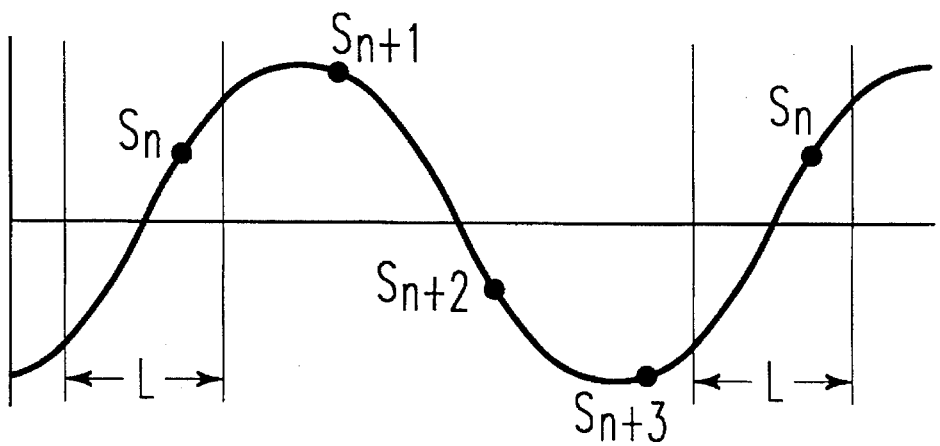
Figure 7:
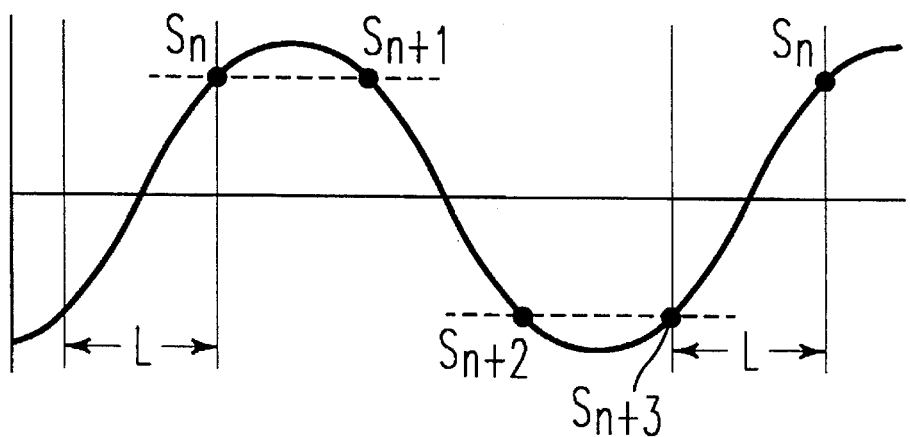
Figure 8:
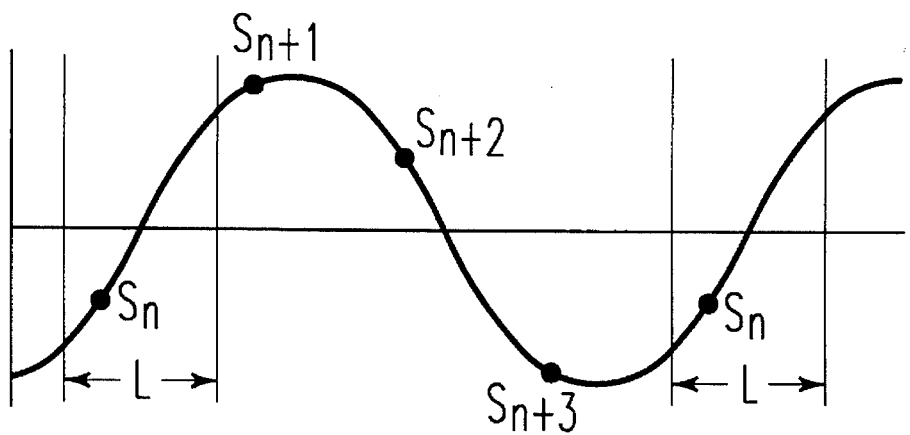

FIG. 5 illustrates sampling at $\theta=0°$, 90°, 180°, 270°, ... while FIG. 6 illustrates sampling at $0°<\theta<45°$, $90°<\theta<135°$, $180°<\theta<225°$, $270°<\theta<315°$, ... FIG. 7 illustrates sampling at $\theta=45°$, 135°, 225°, 315°, ... while FIG. 8 illustrates sampling at $-45°<\theta<0°$, $45°<\theta<90°$, $135°<\theta<225°$, $315°<\theta<360°$, ... Since the frequency of the sampling clock is four times as high as the frequency of the burst signal, the basic signals each have an equivalent value every four samplings.

As can be seen from FIGS. 5 to 8, a value which is used as a base of the sampling clock is to be selected during the period L, such a base may be a time when a value $S_n$ of the basic signal which satisfies the following conditions is sampled.

$$S_n \leq S_{n+1} \text{ and } S_{n+1} > S_{n+2} \qquad \text{(Eq. 2)}$$

It is to be noted here that the values $S_n$, $S_{n+1}$, $S_{n+2}$ and $S_{n+3}$ of the basic signal are sampled at progressively slower timing in this order and therefore have phase differences of 90°.

Thus, judgement performed by the magnitude comparator 7a and the OR gate 8 is in light of the first condition of Eq. 2, and judgement performed by the magnitude comparator 7b is in light of the second condition of Eq. 2. By creating a logical product of the two judgement results by the AND gate 9, a comprehensive judgement in light of Eq. 2 as a whole is yielded.

The AND gate 9 has an input terminal which is connected to the input terminal BIN so as to receive the burst gate pulse BGP. Since a logical product is found by the AND gate 9 also with respect to the burst gate pulse BGP, only one phase reference signal ORG is generated for one, burst signal.

Figure 9:
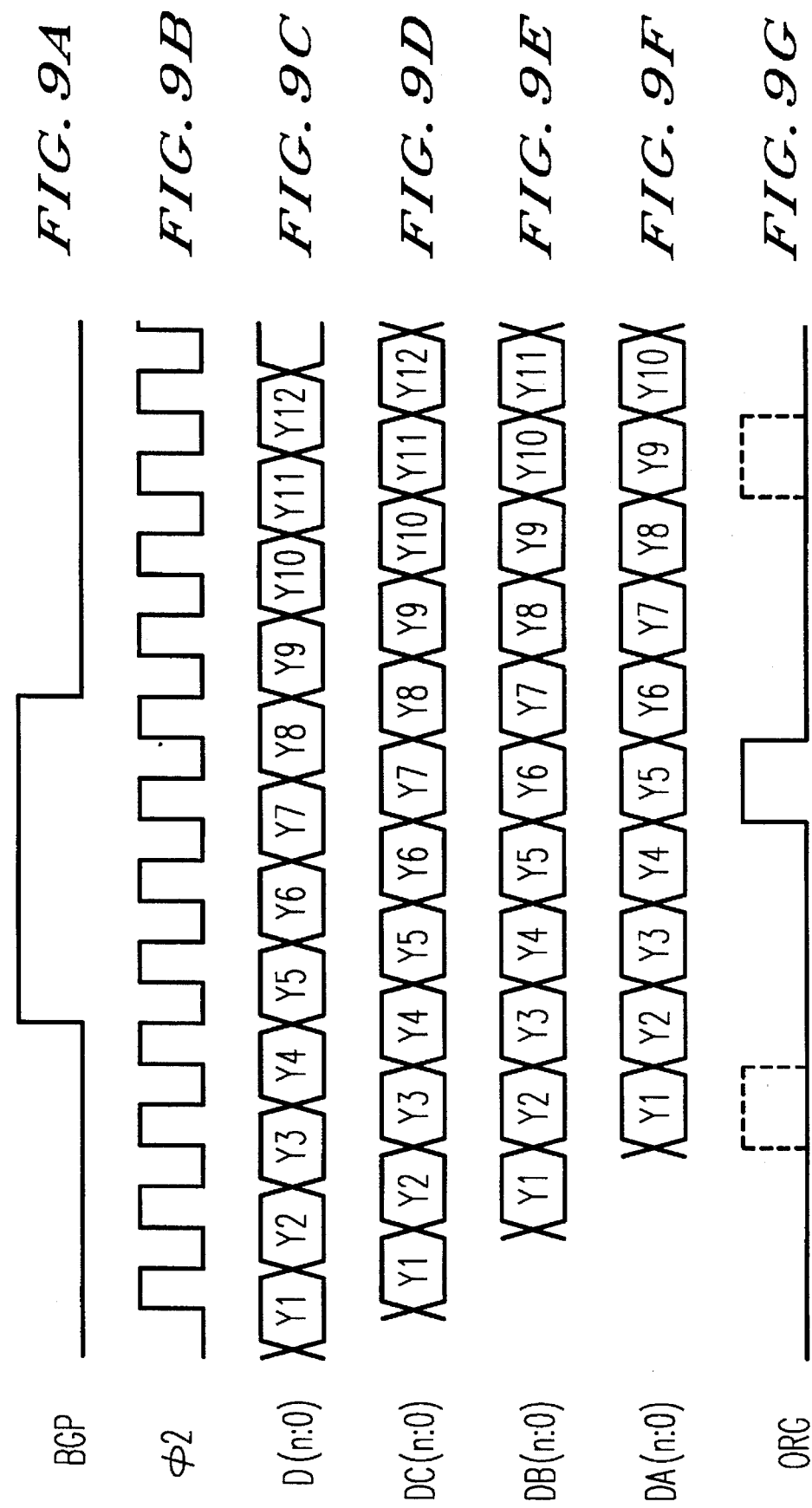
FIG. 9 is a timing chart illustrating generation of a phase reference signal.

FIG. 9 is a timing chart illustrating generation of the phase reference signal ORG. The value of the basic signal gradually varies as $Y_1, Y_2, Y_3, \ldots$ A variation in the value of the basic signal is in accordance with a change in the sampling clock $\phi_2$ since the A/D converter 1 performs sampling at the timing of the sampling clock $\phi_2$. Assume here that a set of values $Y_5, Y_6$ and $Y_7$ of the basic signal satisfies Eq. 2, Eq. 3 below is satisfied.

$$Y_5 \leq Y_6 \text{ and } Y_6 > Y_7 \qquad \text{(Eq. 3)}$$

As described earlier, the basic signal has an equivalent value every four samplings with respect to the burst signal. Hence, other set of values $Y_1, Y_2, Y_3$ or $Y_9, Y_{10}, Y_{11}$ also satisfies Eq. 2. On the other hand, the burst gate pulse BGP is activated only for one cycle of the burst signal, i.e., for only four cycles of the sampling clock $\phi_2$. Therefore, by obtaining a further logical product of the logical product which is found by the AND gate 9 in light of Eq. 2 and activation of the burst gate pulse BGP, the phase reference signal ORG as that shown in FIG. 9 is obtained. In FIG. 9, the dotted line represents waveforms of the phase reference signal ORG as they would have been if activation of the burst gate pulse BGP was not a condition. In the example of FIG. 9, a sampling timing for creating the basic signal $Y_5$ serves as a base used to detect the phase difference.

Returning to FIG. 2, the phase difference detecting circuit 5 will be described. The phase difference detecting circuit 5 comprises input terminals $DIA_{<n:0>}$, $DIB_{<n:0>}$ and $DIC_{<n:0>}$ for respectively receiving the three delayed basic signals $DA_{<n:0>}$, $DB_{<n:0>}$ and $DC_{<n:0>}$ and output terminals $L_1$ and $L_2$ for respectively outputting the equivalent signal EQU and the non-equivalent signal UPDN.

The phase difference detecting circuit 5 judges whether the sampling clock is activated at a timing which is desirable for sampling. The "timing which is desirable for sampling" depends on a modulation method of the color signal. The first preferred embodiment assumes that the modulation method is the NTSC method. The PAL method will be referred to later in relation with other embodiments of the present invention.

Figure 10:
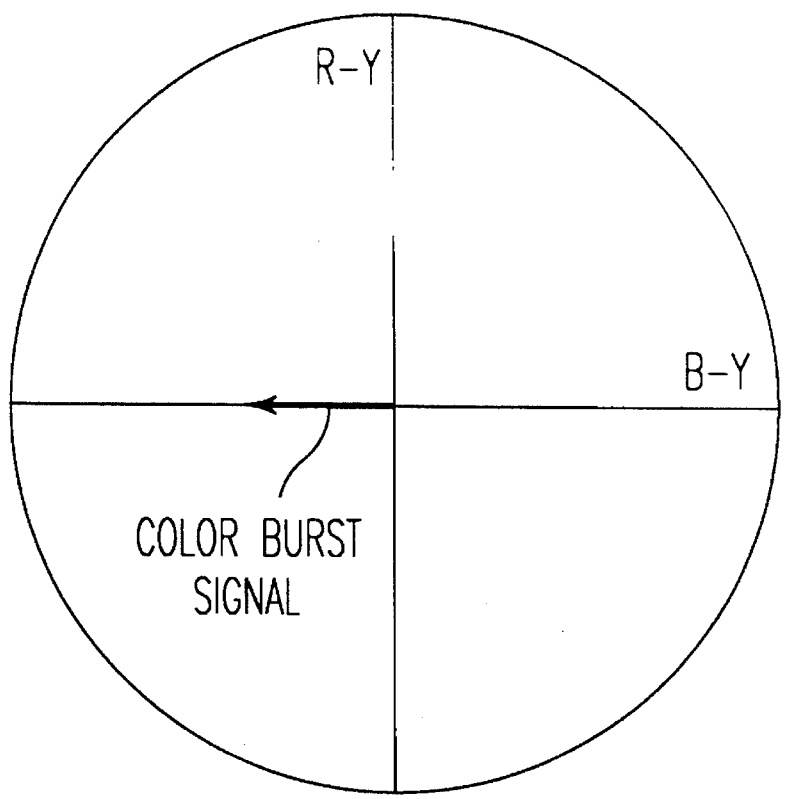
FIG. 10 is a vector diagram showing a phase of a burst signal in the NTSC method.

FIG. 10 is a vector diagram showing a phase of the burst signal with respect to the color-difference signals (R-Y) and (B-Y) in the NTSC method. In the NTSC method, since the vector of the burst signal is on the axis (B-Y), sampling at the timing shown in FIG. 5, i.e., when $\theta=0°, 90°, 180°, 270°, \ldots$ is the most suitable. Hence, if the basic signals sampled at different timings during a 180°-cycle have the same value, that fact is an evidence that the sampling was optimally timed. Otherwise, the sampling clock $\phi_2$ leads or lags behind optimum timing.

Figure 11:
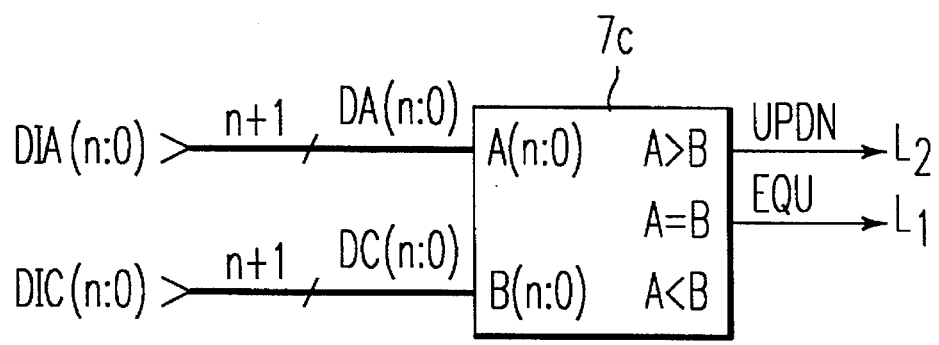
FIG. 11 is a circuitry diagram showing an example of a structure of a phase difference detecting circuit.

FIG. 11 is a circuitry diagram showing an example of a structure of the phase difference detecting circuit 5. The phase difference detecting circuit 5 comprises a magnitude comparator 7c and detects which one of the two delayed basic signals $DA_{<n:0>}$ and $DC_{<n:0>}$ has a larger value in accordance with a predetermined rule. There is no need to deal with the delayed basic signal $DB_{<n:0>}$ in the NTSC method.

When sampling is optimally timed as evidenced by a fact that the two delayed basic signals $DA_{<n:0>}$ and $DC_{<n:0>}$ have the same value, the equivalent signal EQU is activated to rise to "H" level. On the other hand, when the delayed basic signal $DA_{<n:0>}$ has a larger value than the delayed basic signal $DC_{<n:0>}$, the non-equivalent signal UPDN rises to "H" level. This corresponds to where sampling is lagged behind optimal timing as shown in FIGS. 6 and 7.

However, since the delayed basic signals are each serially updated as shown in FIG. 9 and the magnitude comparator 7c only compares these updated signals, even when the values $S_{n+1}$ and $S_{n+3}$ of the basic signal shown in FIG. 8 are supplied respectively as the delayed basic signals $DA_{<n:0>}$ and $DC_{<n:0>}$, the non-equivalent signal UPDN is at "H" level. In reality, FIG. 8 corresponds to where the timing of sampling leads the optimal timing.

The phase reference signal ORG is used to eliminate this dichotomy regarding the non-equivalent signal UPDN. When the delayed basic signal $DA_{<n:0>}$ has the value $S_{n+1}$ of the basic signal, the phase reference signal ORG is not active. To the contrary, when the delayed basic signal $DA_{<n:0>}$ has the value $S_n$ of the basic signal, the phase reference signal ORG is active.

The phase reference signal ORG is supplied to the sampling clock shifting circuit 2 together with the equivalent signal EQU and the non-equivalent signal UPDN which form the phase difference signal so that the phase difference signal serves as valid information which is useful to judge whether the sampling timing leads or lags behind the optimum timing.

When the sampling timing is leading the optimum timing, the non-equivalent signal UPDN is at "L" level. Thus, due to the phase reference signal ORG, the dichotomy of the non-equivalent signal UPDN is eliminated.

Referring again to FIG. 2, the sampling clock shifting circuit 2 will be described. The sampling clock shifting circuit 2 comprises input terminals $L_3$ and $L_4$ for respectively receiving the equivalent signal EQU and the non-equivalent signal UPDN which form the phase difference signal, an input terminal ENB for receiving the phase reference signal ORG, the clock terminal CLK for receiving an original clock $\phi_1$, and an output terminal $L_5$ for outputting the sampling clock $\phi_2$.

The sampling clock shifting circuit 2 shifts the phase of the original clock $\phi_1$, whereby the sampling clock $\phi_2$ is generated. This phase shifting is performed in accordance with the phase difference signal and in light of the phase reference signal ORG.

For instance, the original clock $\phi_1$ is obtained by multiplying the frequency of a carrier which is synchronized with the chrominance subcarrier four times by a resonance circuit which utilizes a PLL circuit.

Figure 12:
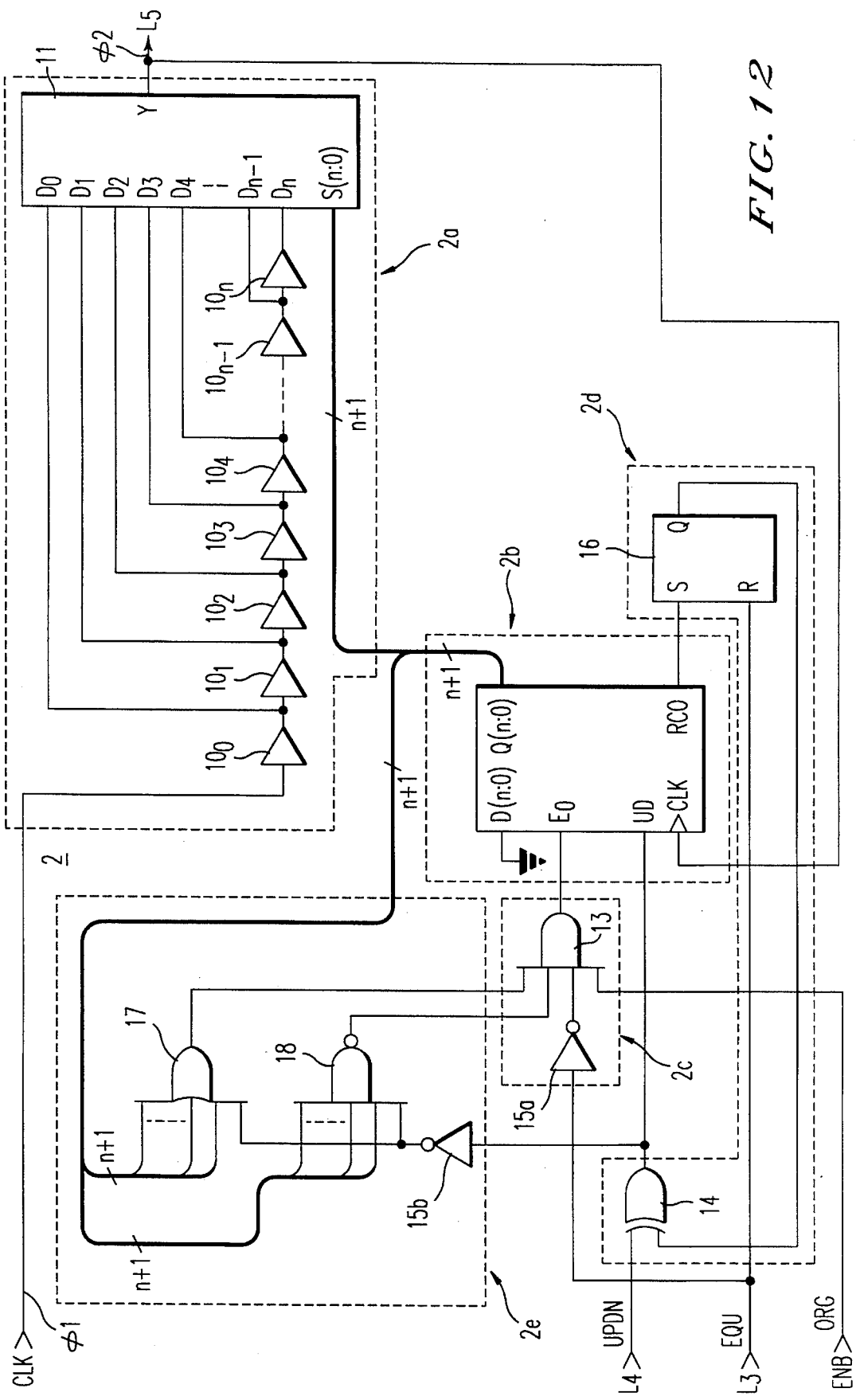
FIG. 12 is a circuitry diagram showing an example of a structure of a sampling clock shifting circuit.

FIG. 12 is a circuitry diagram showing an example of a structure of the sampling clock shifting circuit 2. The sampling clock shifting circuit 2 comprises delaying means 2a, a select signal generating circuit 2b, counter operation allowing means 2c, counting direction reversing means 2d and shifting stopping means 2e.

The delaying means 2a includes a plurality of delaying elements $10_0, 10_1, \ldots, 10_n$ which are serially connected to each other. The delaying element $10_0$ receives the original clock $\phi_1$, and the other delaying elements $10_1, 10_2, \ldots, 10_n$ receive outputs of previous delaying elements $10_0, 10_1, \ldots, 10_{n-1}$, respectively. Outputs of the delaying elements $10_0, 10_1, \ldots, 10_n$ are supplied to an n-to-0 selector circuit 11. In accordance with data which is supplied through a select terminal $S_{<n:0>}$, the n-to-0 selector circuit 11 selectively outputs at its output terminal Y either one of data received at its input terminals $D_0, D_1, \ldots, D_n$. Since outputs of the delaying elements $10_0, 10_1, \ldots, 10_n$ are supplied to the input terminals $D_0, D_1, \ldots, D_n$, respectively, it is possible for the delaying means 2a to select and output a sampling clock out of clock signals which are variously delayed, that is, which have different phases from each other.

The select signal generating circuit 2b determines which data is supplied to the select terminal $S_{<n:0>}$ when the phase difference signal and the phase reference signal ORG are in which condition.

The select signal generating circuit 2b is formed by a counter 12. The counter 12 has an enable terminal $E_o$, the clock terminal CLK, a carry-out terminal RCO, a count output terminal $Q_{<n:0>}$ and a counting direction control terminal UD.

When a signal supplied to the enable terminal $E_o$ is at "H" level, the counter 12 counts rises of a signal which is supplied to the clock terminal CLK. As to the direction of counting, the rises are counted up when a signal supplied to the counting direction control terminal UD is at "H" level, while the rises are counted down when a signal supplied to the counting direction control terminal UD is at "L" level. A result of the counting is an (n+1)-bit signal which is outputted through the count output terminal $Q_{<n:0>}$. The carry-out terminal RCO is activated like a pulse for every maximum count and a minimum count.

The counter operation allowing means 2c is connected to the enable terminal $E_o$. The counter operation allowing means 2c includes an inverter 15a and an AND gate 13. If an output of the shifting stopping means 2e should be disregarded, the level of a signal outputted by the counter operation allowing means 2c would be "H" level when the phase reference signal ORG is at "H" level and the equivalent signal EQU is at "L" level.

In the counter operation allowing means 2c operating in such a manner, the equivalent signal EQU rises to "H" level when sampling is optimally timed by the sampling clock $\phi_2$, and therefore, the sampling clock $\phi_2$ is not shifted and the counter 12 does not operate. In addition, since the counter 12 can operate only when the phase reference signal ORG is at "H" level, the dichotomy of the phase difference signal is eliminated.

The counting direction reversing means 2d includes an EXOR gate 14 and an RS flip-flop 16. As described later, in some cases, it is necessary to advance the sampling clock although an advance of the sampling clock is detected by the phase difference signal. In such a case, the counting direction reversing means 2d reverses the logic of the non-equivalent signal UPDN and supplies the reversed logic to the counting direction control terminal UD of the counter 12. Also in a case where it is necessary to delay the sampling clock a delay of the sampling clock is detected by the phase difference signal, the reversed logic of the non-equivalent signal UPDN is supplied to the counting direction control terminal UD.

The shifting stopping means 2e includes an (n+2)-bit OR gate 17, an (n+2)-bit NAND gate 18 and an inverter 15b. An output of the EXOR gate 14 is supplied to an input terminal of the inverter 15b. An output of the counter 12 is supplied to an (n+1) bit of an input terminal of the OR gate 17, while an output of the inverter 15b is supplied to the remaining one bit of the input terminal of the OR gate 17. In a similar manner, an output of the counter 12 is supplied to an (n+1) bit of the NAND gate 18 while an output of the inverter 15b is supplied to the remaining one bit of the NAND gate 18.

FIGS. 13 to 15 are timing charts showing waveforms of the respective signals. In the following, an operation of the shifting stopping means 2e will be described while referring to the illustrated examples.

A) First Case (FIG. 13)

Where the sampling clock $\phi_2$ is leading the optimum timing, to delay the sampling clock $\phi_2$, the counter 12 counts in such a direction which causes its count to increment. At this point, a carry-out is not activated yet, thereby allowing the non-equivalent signal UPDN to pass through the EXOR gate 14 so that "L" level is available at the counting direction control terminal UD (i.e., before a time $t_1$).

As the sampling clock $\phi_2$ is shifted to lead the burst signal, the counter 12 registers a maximum count (here, value "F" (=15)). When the counter 12 registers a maximum count, every (n+1) bit of an output of the counter 12 is at the "H" level. These (n+1)-bit data are supplied to the input terminal of the NAND gate 18.

When the carry-out is activated as a pulse, an output of the RS flip-flop 16 rises to "H" level to permit the EXOR gate 14 to function as an inverter. Hence, even when the non-equivalent signal UPDN is still at "L" level, the counter 12 receives "H" level at its counting direction control terminal UD. This means that the counter 12 counts down if it is allowed to continue counting.

The inverter 15b supplies "L" logic level to the rest portion of the input terminal of the NAND gate 18, with a result that the NAND gate 18 keeps outputting "H" logic level. This allows "H" level to keep appearing at the enable terminal $E_o$ and hence the counting to continue. However, since the counter 12 counts down, the sampling clock $\phi_2$ is shifted to lead the burst signal (i.e., after a time $t_2$).

Thus, there is a case where the phase of the sampling clock $\phi_2$ is advanced even though it is judged that the sampling clock $\phi_2$ is already leading the burst signal. Since the sampling clock $\phi_2$ having a further delay cannot be supplied any more, control performed here is aiming at finding other clock signal. For example, assume that a phase difference (phase advance) of the sampling timing with respect to the optimal timing is $\theta=-45°$ in terms of the phase of the burst signal. When an output of the delaying element $10_n$ is currently used as the sampling clock $\phi_2$, by using a clock signal which has a further phase, advance of 45° as the sampling clock $\phi_2$ instead, it is possible to optimally time sampling. This is because sampling is performed for every quarter cycle (90°) of the burst signal.

In other words, since it is possible to know a phase advance and a phase lag in sampling during the period L ($\theta=-45°$–45°), it has to be possible to shift the sampling clock $\phi_2$ in a range of at least one cycle of the original clock $\theta_1$.

When the sampling clock $\phi_2$ advancing in this manner finally reaches the optimum sampling timing, the equivalent signal EQU is activated. As a result, the RS flip-flop 16 is reset and the EXOR gate 14 ceases to serve as an inverter (i.e., a time $t_3$).

Following this, counting up and counting down are repeated in accordance with the logic of the non-equivalent signal UPDN, during which the sampling clock $\theta_2$ automatically reaches the optimum sampling timing (i.e., after a time $t_4$).

B) Second Case (FIG. 14)

While the counter 12 registers a minimum count and the phase of the sampling clock $\phi_2$ is further advanced in the first case, in the second case, the phase of the sampling clock $\phi_2$ is delayed after a minimum count is registered by the counter 12 and every (n+1) bit of an output of the counter 12 falls to "L" level.

In FIG. 14, the waveforms are the same as they are in the first case until the time $t_1$. However, after the counter 12 registers a minimum count at the time $t_1$, it becomes necessary to delay the phase of the sampling clock $\phi_2$ at the time $t_2$; that is, the non-equivalent signal UPDN rising to "H" level. Since "H" level is available from the RS flip-flop 16, the EXOR gate 14 reverses the non-equivalent signal UPDN to output "L" level. However, this "L" logic level is again reversed by the inverter 15b and supplied to the input terminal of the NAND gate 18.

As a result, "H" level appears at every bit of the NAND gate 18 so that "L" level appears at the output terminal of the NAND gate 18. Hence, an output of the AND gate 13 is at "L" level and the counter 12 stops counting.

The reason for disabling the counter 12 when it becomes necessary to delay the phase of the sampling clock $\phi_2$ immediately after the counter 12 has registered a minimum count is as follow.

First, since the counter 12 registered a minimum count at the time $t_1$, it was necessary to advance the phase of the sampling clock $\phi_2$ up to this point. On the other hand, it became necessary to delay the phase of the sampling clock $\phi_2$ at the time $t_2$. Such a demand for the sampling clock $\phi_2$ suggests that the current sampling clock is activated in the vicinity of the optimal sampling timing.

This situation could occur when a gap between the current sampling clock and the optimal sampling timing is smaller than a delay which is created by each delaying element. In such a case, there is no need any more to shift the sampling clock $\phi_2$. The counter 12 is stopped for this reason.

As it becomes necessary to advance the phase of the sampling clock $\phi_2$ at a time $t_5$, counting down is started as in the first case.

C) Third Case (FIG. 15)

When the sampling clock $\phi_2$ is behind the optimum sampling timing unlike in the first and the second cases, to advance the sampling clock $\phi_2$, the counter 12 starts counting in such a direction which causes its count to decrement. At this point, a carry-out is not activated yet, thereby allowing the non-equivalent signal UPDN to pass through the EXOR gate 14 so that "H" level is available at the counting direction control terminal UD (i.e., before a time $t_6$).

As the sampling clock $\phi_2$ is shifted to be lagged behind the burst signal, the counter 12 registers a minimum count "0." When the counter 12 registers the minimum count, every (n+1) bit of an output of the counter 12 falls to "L" level. These (n+1)-bit data are supplied to the input terminal of the OR gate 17.

On the other hand, as in the second case, when the non-equivalent signal UPDN changes from "H" level to "L" level and it becomes accordingly necessary to delay the sampling clock $\phi_2$, the counter 12 is stopped. This is because every data supplied to the input terminal of the OR gate 17 is "L" level (at a time $t_7$).

When it becomes necessary to advance the sampling clock $\phi_2$, the non-equivalent signal UPDN changes to "H" level However, since the EXOR gate 14 reverses the non-equivalent signal UPDN and supplies the same to the counting direction control terminal UD of the counter 12, the counter 12 counts up and the phase of the sampling clock $\phi_2$ is delayed. The reason for controlling in such a manner that the phase of the sampling clock $\phi_2$ is delayed despite the need to advance the phase of the sampling clock $\phi_2$ is the same as the reason described earlier for advancing the phase of the sampling clock $\phi_2$ despite the need to delay the phase of the sampling clock $\phi_2$.

Following this, the RS flip-flop 16 is resell as the equivalent signal EQU is activated. If the non-equivalent signal UPDN is at "H" level, the counter 12 counts down to advance the sampling clock $\phi_2$ (i.e., after a time $t_9$).

Briefly summarizing the operation in the first preferred embodiment, the phase difference detecting circuit 5 detects whether the sampling clock $\phi_2$ has a phase advance or a phase lag with respect to the optimal sampling timing and outputs the phase difference signal. The phase reference signal ORG which is used as a reference to determine a phase advance and a phase lag is generated by the phase reference detecting circuit 4. In accordance with these signals, the sampling clock shifting circuit 2 shifts the sampling clock $\phi_2$ so that the sampling clock $\phi_2$ is activated at an optimal sampling timing. Sampling is performed in accordance with such a sampling clock $\phi_2$, whereby the basic signal is generated from which the phase reference signal ORG and the phase difference signal (that is, the equivalent signal EQU and the non-equivalent signal UPDN) are generated.

Thus, since a feedback regarding the sampling clock $\phi_2$ is utilized, it is possible to automatically find an optimal sampling timing and control the phase of the sampling clock $\phi_2$. Hence, during demodulation of the color signal, it is possible to avoid the conventional problems such as a distorted color phase.

C. Second Preferred Embodiment

A second preferred embodiment is a particularly preferable mode of the first preferred embodiment. As described with reference to FIGS. 13 to 15, in some cases, the counter 12 registers a minimum count although the phase of the sampling clock $\phi_2$ needs be advanced, while in some other cases, the counter 12 registers a maximum count despite a need for delaying the phase of the sampling clock $\phi_2$. In these cases, the phase is delayed or advanced accordingly as described earlier in relation to the first preferred embodiment, whereby the phase of the sampling clock $\phi_2$ is adjusted to an optimal sampling timing.

Here, it is to be noted that the phase of the sampling clock $\phi_2$ stays largely deviated from the optimal sampling timing for a long time in many such cases. The object of the second preferred embodiment is to make such an undesirable situation less likely. That is, the second preferred embodiment is related to a technique for determining how much the delaying means 2a should delay the sampling clock $\phi_2$, i.e., how much delays the delaying elements $10_0, 10_1, \ldots, 10_n$ should provide.

Figure 16A:
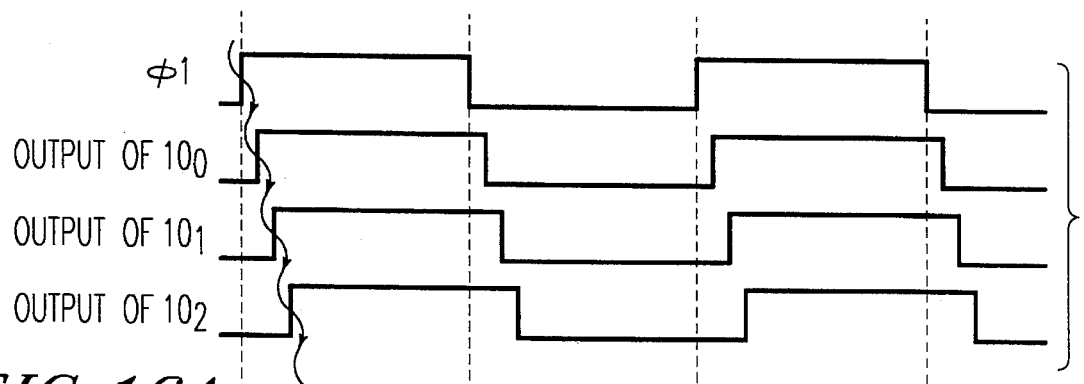
FIG. 16 is a timing chart showing waveforms of an original clock and outputs of delaying elements.
Figure 16B:
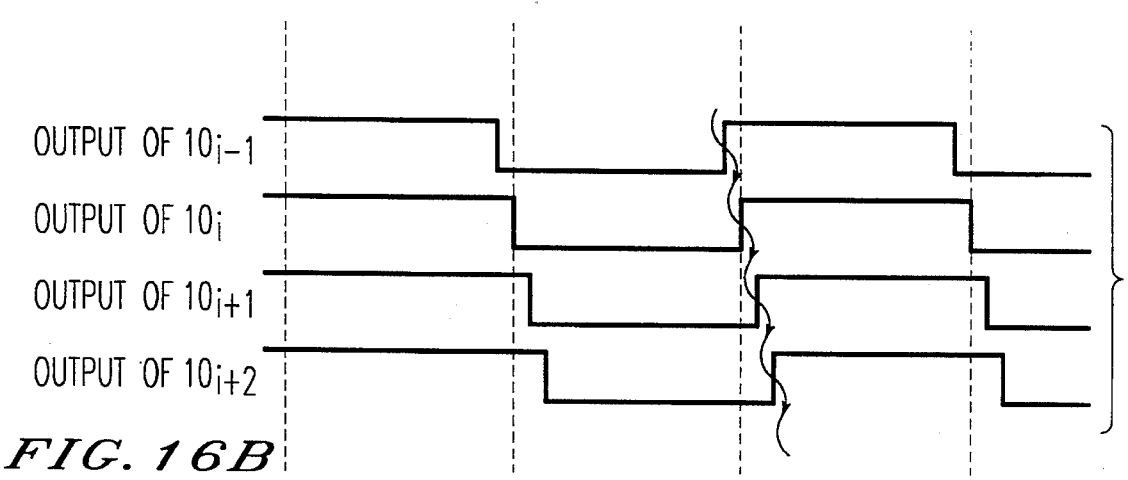
Figure 16C:
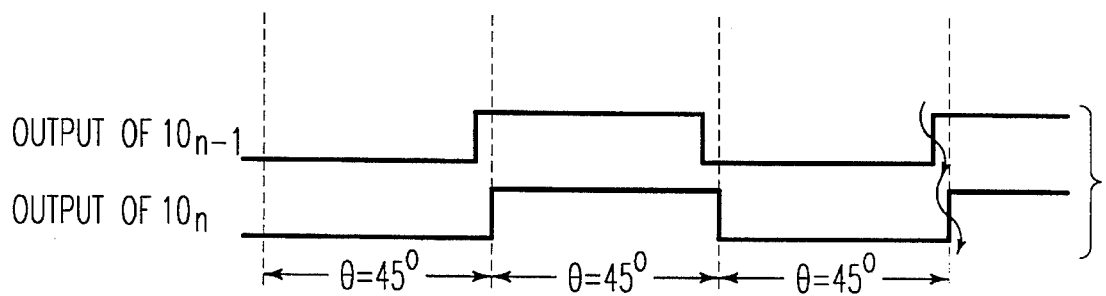

FIG. 16 is a timing chart showing waveforms of the original clock $\phi_1$ and outputs of the delaying elements $10_0, 10_1, \ldots, 10_n$. A delay created by each delaying element is set smaller than ½ cycle of the original clock $\phi_1$ (i.e., smaller than θ=45° in terms of the phase of the burst signal; ⅛ cycle). An output of the delaying element $10_n$ with the largest delay arrives with a delay of ⅜ cycle of the original clock $\phi_1$ (that is, ⅜ cycle of the burst signal) from the original clock $\phi_2$. In other words, it is allowable to shift the sampling clock $\phi_2$ in the range of ⅜ cycle of the original clock $\phi_1$.

If it was determined that the sampling clock $\phi_2$ can be shifted in the range of only one cycle of the original clock $\phi_1$, the following problem arises. In shifting the sampling clock $\phi_2$ so that the sampling clock $\phi_2$ is activated at an optimal sampling timing, one of the cases in which the sampling clock $\phi_2$ is shifted by the largest amount is where it is impossible to delay the sampling clock $\phi_2$ any more despite the sampling clock $\phi_2$ having a little phase advance from the optimal sampling timing. In such a case, it is necessary to advance the phase by about 90° in terms of the phase of the burst signal. That is, the counter 12 must count down from a maximum count to a minimum count on a count by count basis. While the counter 12 counts down, any color signal inputted during this period cannot be sampled at a proper timing. Thus, "discontinuous sampling" is in progress during this period.

Figure 17:
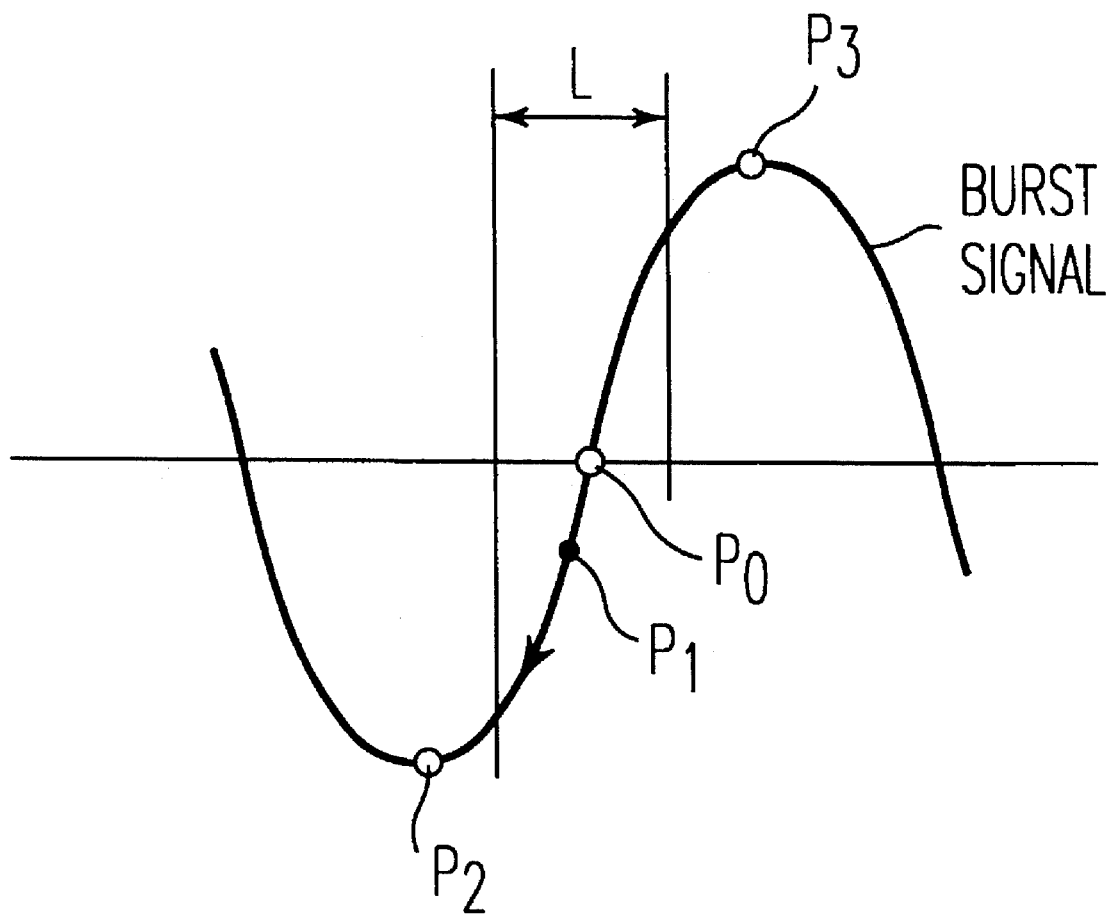
FIG. 17 is a graph schematically illustrating shifting of a sampling clock.

This problem is solved by further delaying the sampling clock $\phi_2$. FIG. 17 is a graph schematically illustrating shifting of the, sampling clock $\phi_2$. A point $P_1$ is a sampling timing of the current sampling clock $\phi_2$. By shifting the point $P_1$ by about 90° to a point $P_2$, sampling is timed optimally. On the other hand, by shifting the point $P_1$ toward a point $P_3$, it is possible to smoothly and continuously perform sampling at optimal timing (i.e., an a point $P_0$).

An allowable amount of a phase shift should be preferably set as a margin for both advancing and delaying the phase. The margin need not be set larger than 45° in terms of the phase of the burst signal since sampling timing arises every 90°. Hence, allowable amounts for shifting the sampling clock $\phi_2$ to solve the problem above is 90°+45°=135° as a whole, or ⅜ of the cycle of the burst signal is a necessary and sufficient amount.

D. Third Preferred Embodiment

Figure 18:
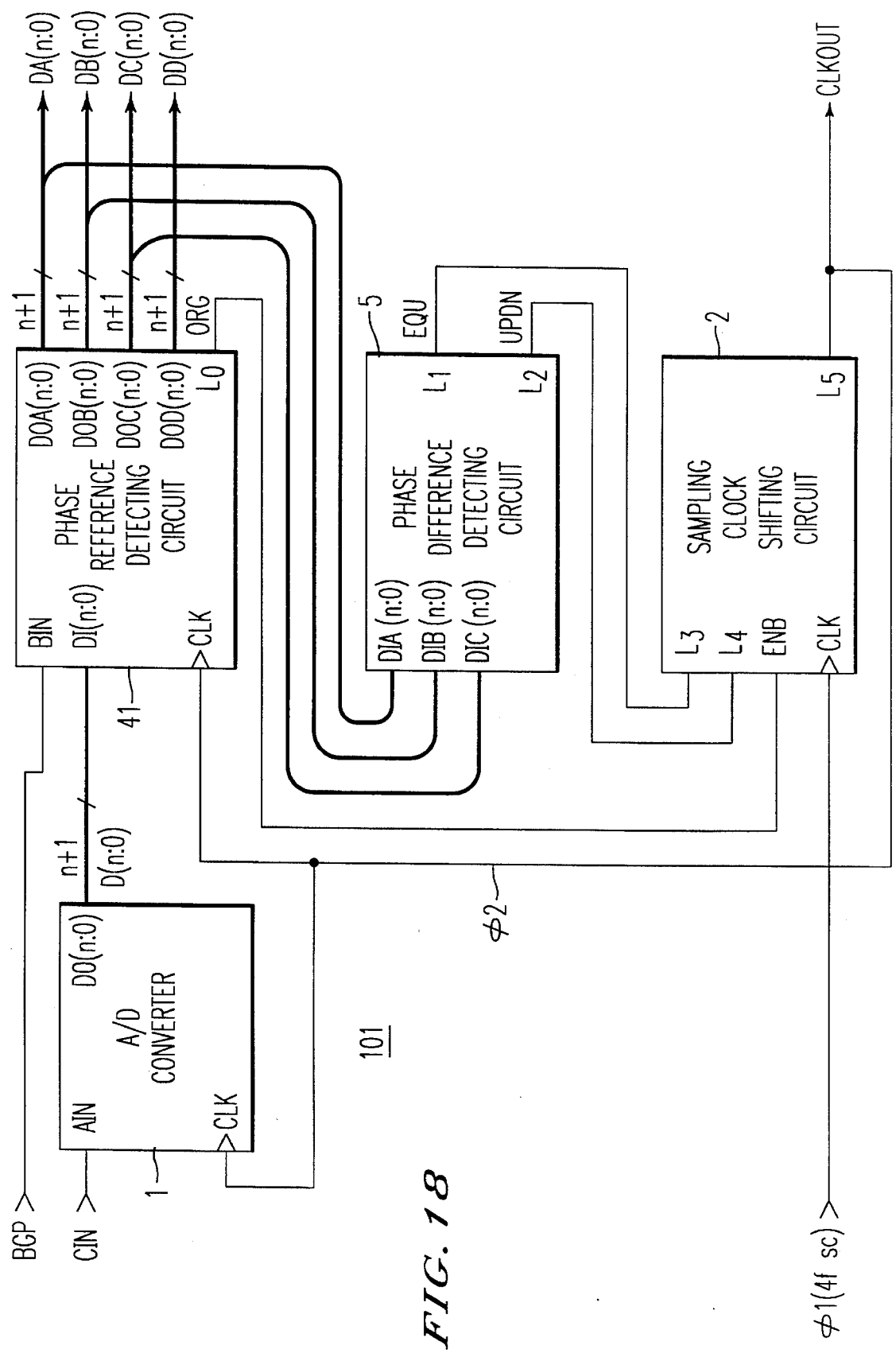
FIG. 18 is a circuitry diagram showing a structure of a sampling circuit according to a third preferred embodiment of the present invention.

FIG. 18 is a circuitry diagram showing a structure of a sampling circuit 101 according to a third preferred embodiment of the present invention. The sampling circuit 101 is similar to the sampling circuit 100 of the first preferred embodiment as it is modified to replace the phase reference detecting circuit 4 with a phase reference detecting circuit 41.

Figure 19:
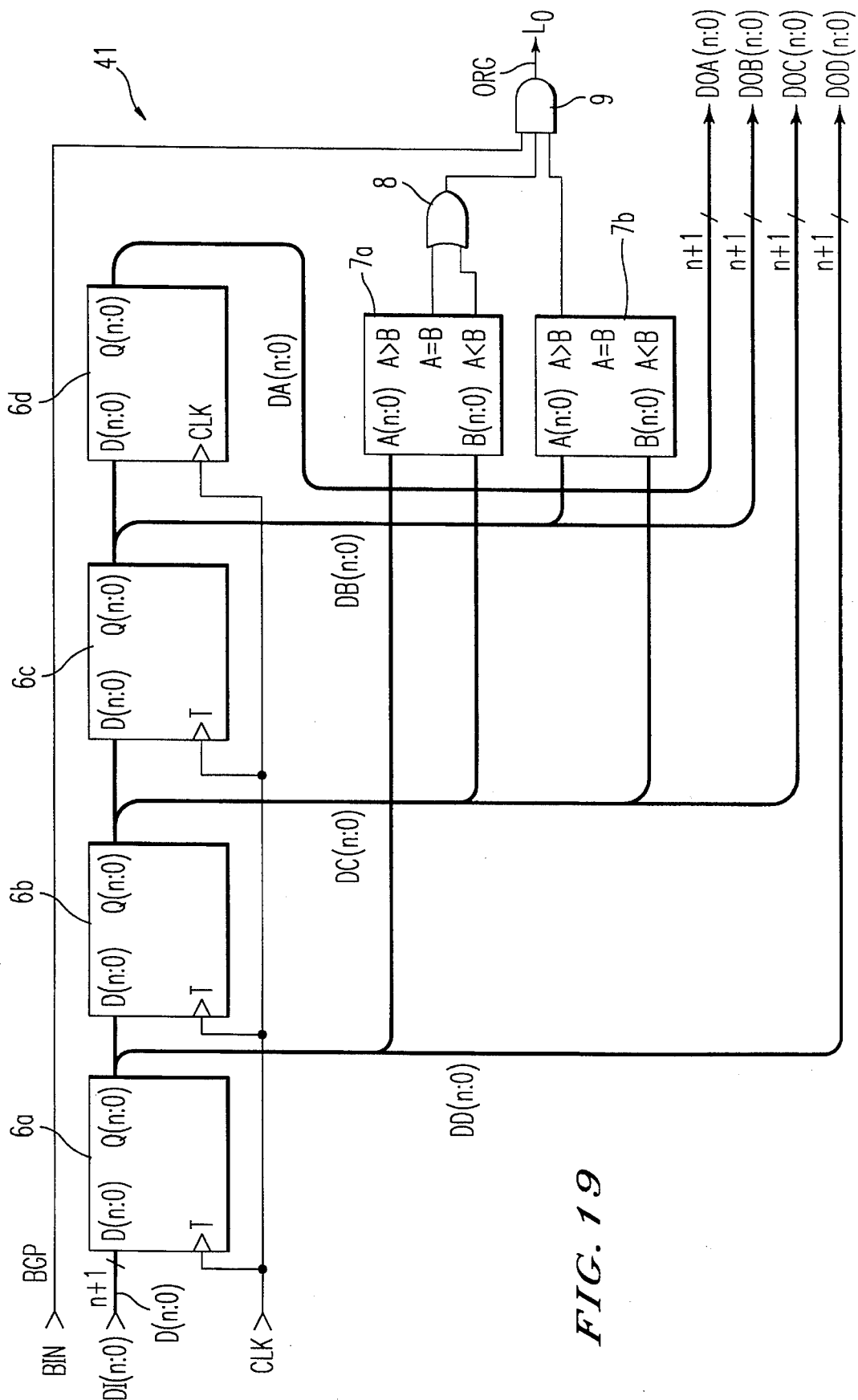
FIG. 19 is a circuitry diagram showing an example of a structure of a phase reference detecting circuit.

FIG. 19 is a circuitry diagram showing an example of a structure of the phase reference detecting circuit 41. The phase reference detecting circuit 41 comprises (n+1)-bit D-type flip-flops 6a, 6b, 6c and 6d which are serially connected to each other, (n+1)-bit magnitude comparators 7a and 7b, an OR gate 8 and an AND gate 9. The D-type flip-flops 6a, 6b, 6c and 6d output delayed basic signals $DD_{<n:0>}$, $DC_{<n:0>}$, $DB_{<n:0>}$ and $DA_{<n:0>}$, respectively, which are obtained by delaying the basic signal $D_{<n:0>}$ at activation of the sampling clock $\phi_2$.

In the circuit of FIG. 19, the D-type flip-flops 6a, 6b and 6c operate in a similar manner to the D-type flip-flops 6b, 6c and 6d of the circuit of FIG. 4. Hence, the phase reference signal ORG is activated while the delayed basic signal $DB_{<n:0>}$ is within the range of θ= −45°–45°.

Figure 20:
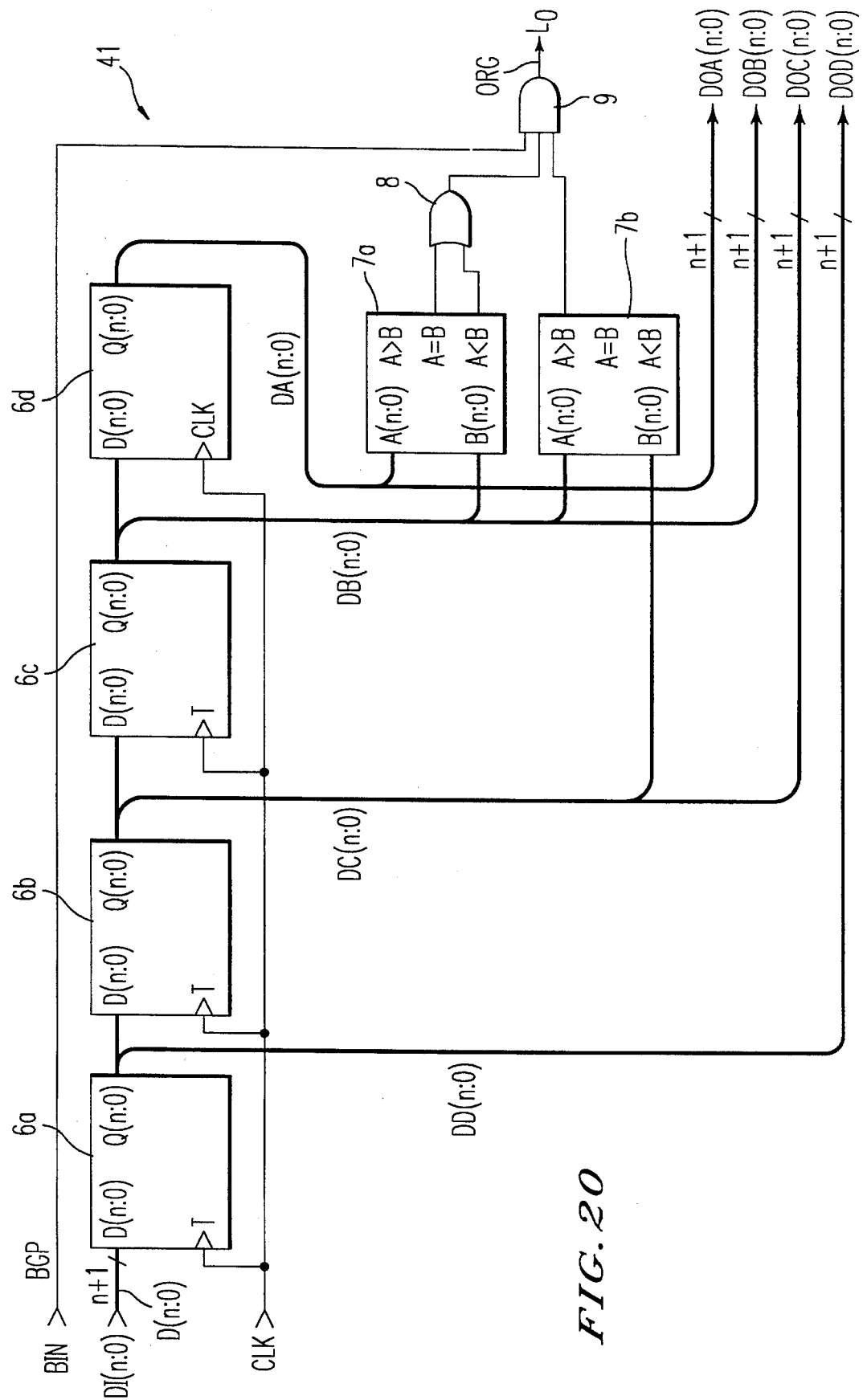
FIG. 20 is a circuitry diagram showing other example of a structure of the phase reference detecting circuit.
Figure 21:
FIG. 21 is a timing chart showing a relation between a phase reference signal, a basic signal and delayed basic signals.

FIG. 20 is a circuitry diagram showing another example of a structure of the phase reference detecting circuit 41. In the circuit of FIG. 20, the D-type flip-flops 6b, 6c and 6d operate in a similar manner to the D-type flip-flops 6b, 6c and 6d of the circuit of FIG. 4. Hence, the phase reference signal ORG is activated while the delayed basic signal $DA_{<n:0>}$ is within the range of θ= −45°–45°. It then follows that a relation between the phase reference signal ORG, the basic signal $D_{<n:0>}$ and the delayed basic signals $DD_{<n:0>}$, $DC_{<n:0>}$, $DB_{<n:0>}$ and $DA_{<n:0>}$ is as shown in the timing chart of FIG. 21.

Figure 22:
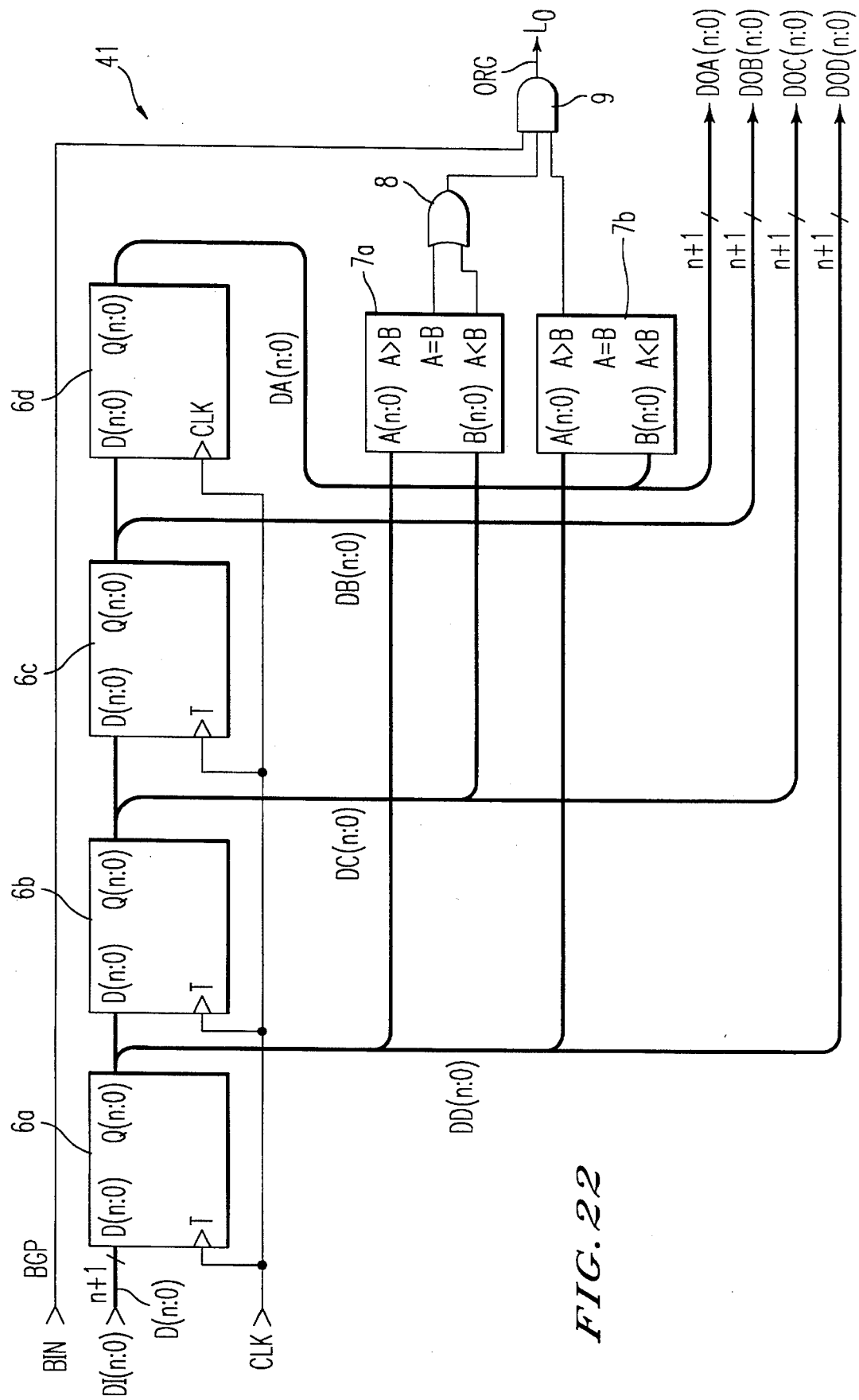
FIG. 22 is a circuitry diagram showing still other example of a structure of the phase reference detecting circuit.

FIG. 22 is a circuitry diagram showing still another example of a structure of the phase reference detecting circuit 41. From FIGS. 5 to 8, it is understood that the timing at which the basic signal has the value $S_n$ is within the range of θ=−45°–45° if Eq. 4 is satisfied.

$$S_{n+2} \geq S_{n+3} \text{ and } S_{n+3} < S_n \qquad \text{(Eq. 4)}$$

Judgement performed by the magnitude comparator 7a and the OR gate 8 is in light of the first condition of Eq. 4, and judgement performed by the magnitude comparator 7b is in light of the second condition of Eq. 4. By creating a logical product of the two judgement results by the AND gate 9, a comprehensive judgement in light of Eq. 4 as a whole is yielded.

In the circuit of FIG. 22, the phase reference signal ORG is activated while the delayed basic signal $DA_{<n:0>}$ is within the range of θ=−45°–45°.

Figure 23:
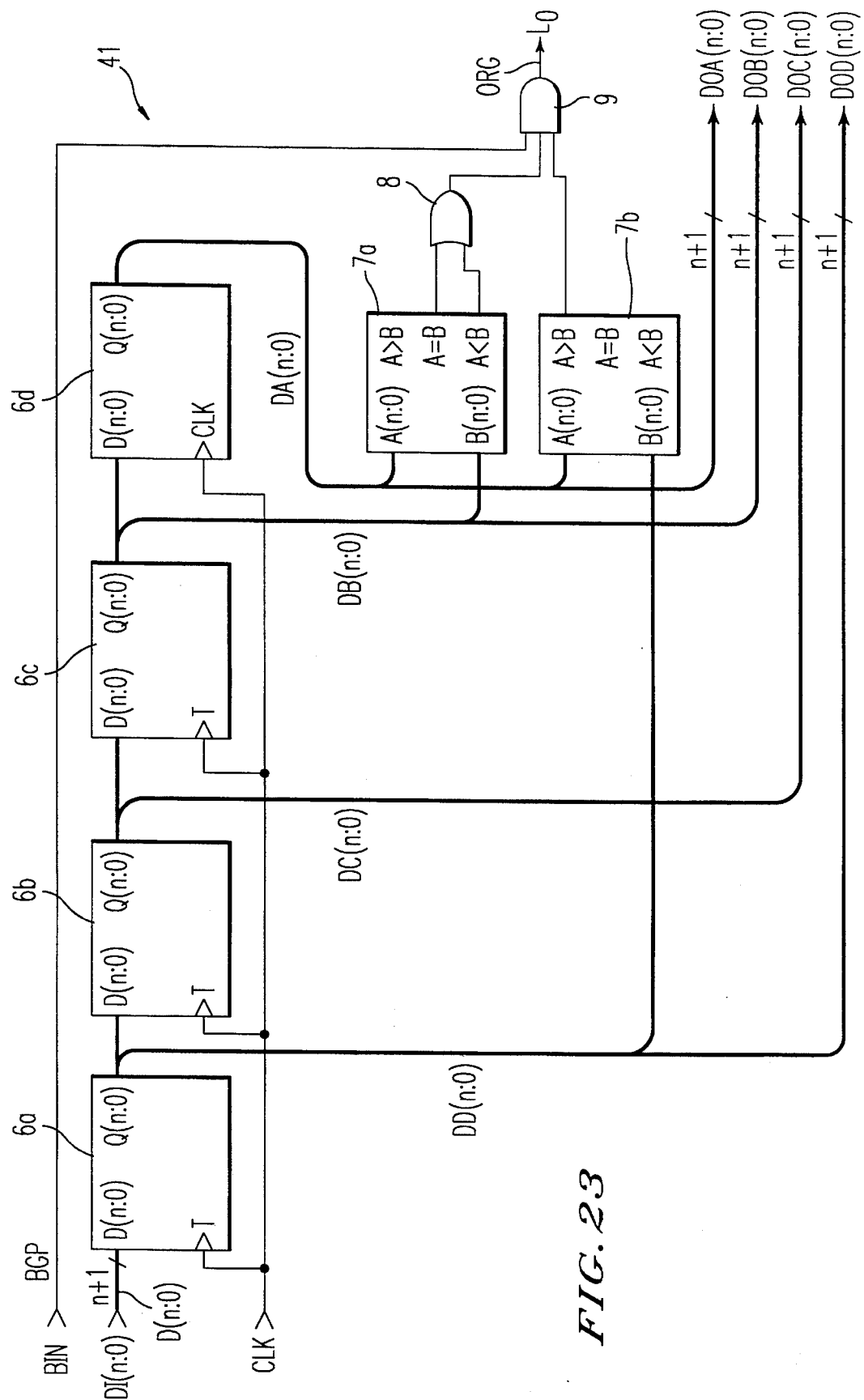
FIG. 23 is a circuitry diagram showing a further example of a structure of the phase reference detecting circuit.

FIG. 23 is a circuitry diagram showing a further example of a structure of the phase reference detecting circuit 41. From FIGS. 5 to 8, it is understood that the timing at which the basic signal has the value $S_n$ is within the range of θ= −45°– 45° if Eq. 5 is satisfied.

$$S_n \leq S_{n+1} \text{ and } S_{n+3} < S_n \qquad \text{(Eq. 5)}$$

Judgement performed by the magnitude comparator 7a and the OR gate 8 is in light of the first condition of Eq. 5, and judgement performed by the magnitude comparator 7b is in light of the second condition of Eq. 5. By creating a logical product of the two judgement results by the AND gate 9, a comprehensive judgement in light of Eq. 5 as a whole is yielded.

In the circuit of FIG. 23, the phase reference signal ORG is activated while the delayed basic signal $DA_{<n:0>}$ is within the range of θ= −45°–45°.

Thus, these four types of the delayed basic signals may be generated to obtain the phase reference signal ORG from the three of the four types of the delayed basic signals.

E. Fourth Preferred Embodiment

Figure 24:
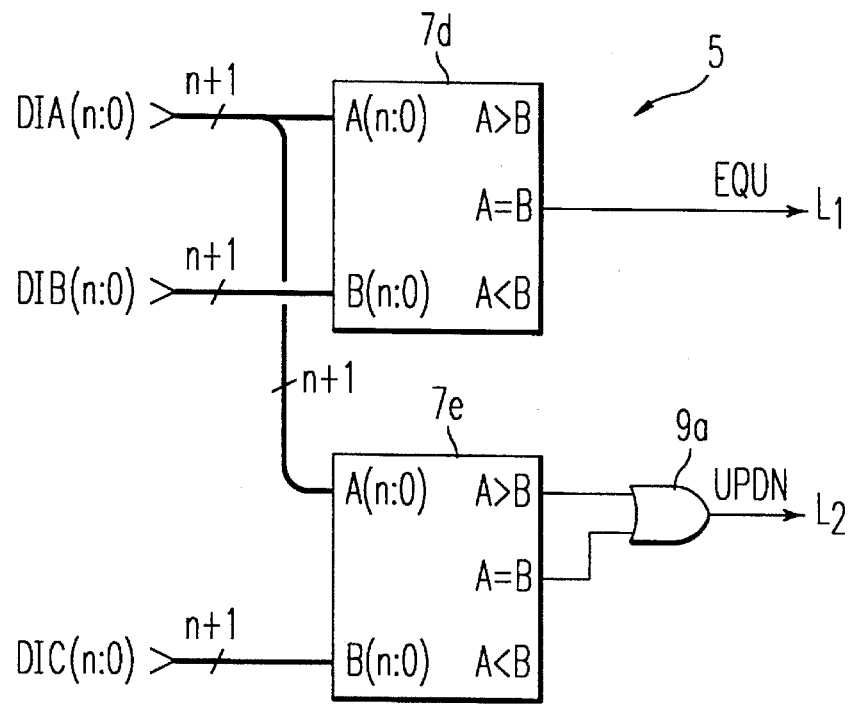
FIG. 24 is a circuitry diagram showing a structure of a phase difference detecting circuit according to a fourth preferred embodiment of the present invention.

FIG. 24 is a circuitry diagram showing a structure of the phase difference detecting circuit 5 according to a fourth preferred embodiment of the present invention. The phase difference detecting circuit 5 comprises magnitude comparators 7d and 7e. According to a predetermined rule, the phase difference detecting circuit 5 detects which one of the three delayed basic signals $DA_{<n:0>}$, $DB_{<n:0>}$ and $DC_{<n:0>}$ is larger than the other two.

Figure 25:
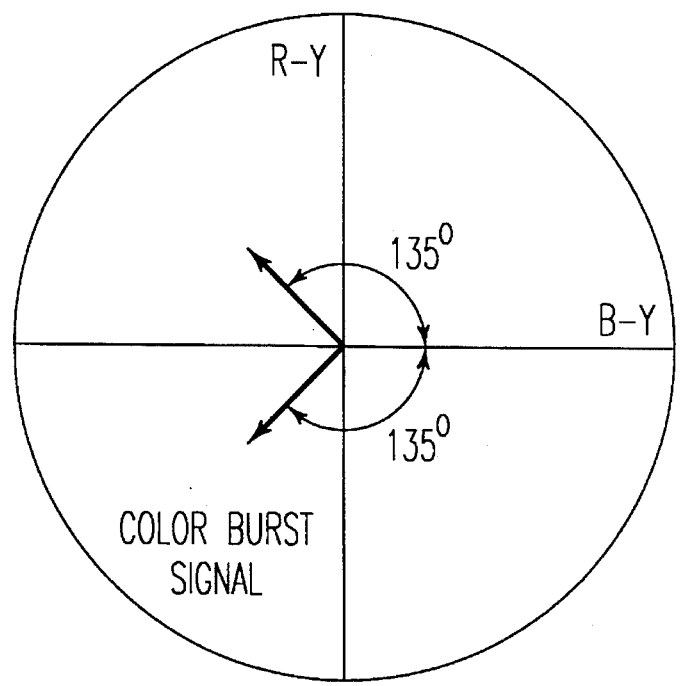
FIG. 25 is a vector diagram showing a phase of a burst signal in the PAL method.
Figure 26:
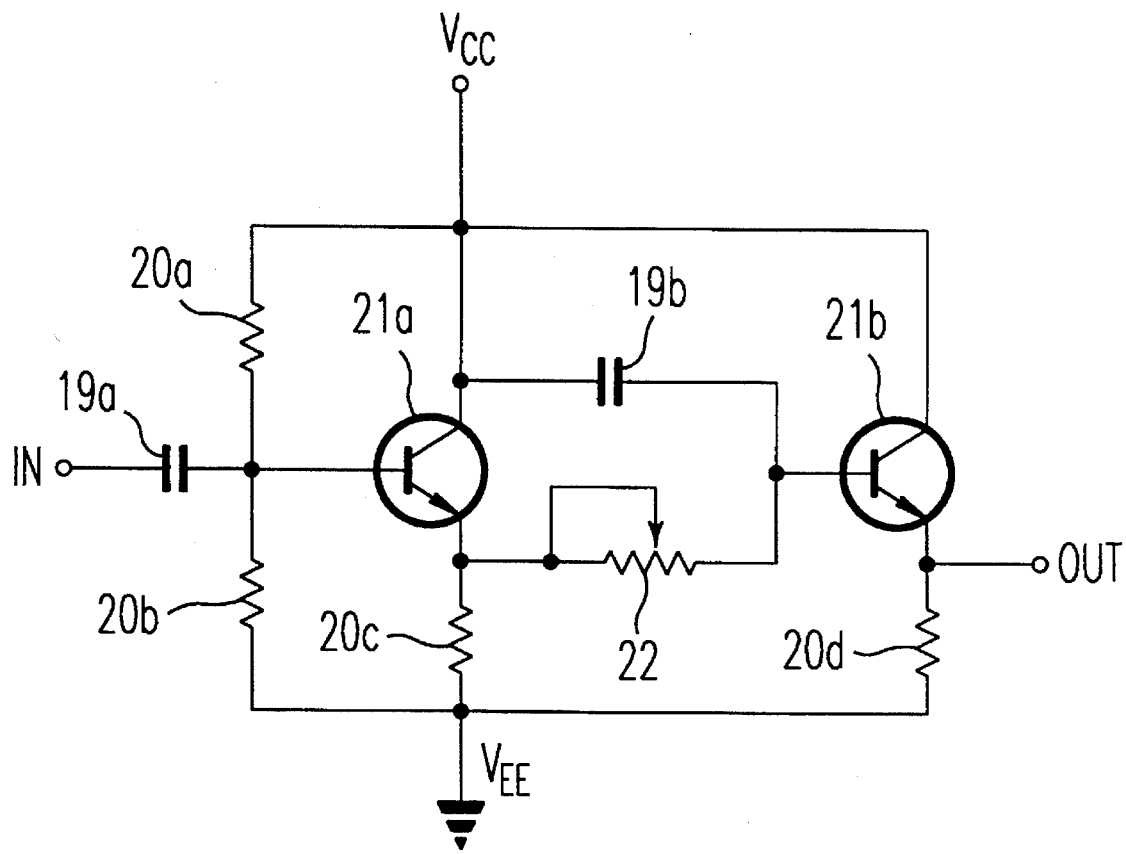
FIG. 26 is a circuitry diagram showing a structure of a conventional sampling circuit.

FIG. 25 is a vector diagram showing the phase of the burst signal with respect to the color-difference signals (R-Y) and (B-Y) in the PAL method. In the PAL method, since the vector of the burst signal has phase differences of +135° and −135° with respect to the axis (B-Y), sampling at the timing shown in FIG. 7, i.e., when θ=45°, 135°, 225°, 315°, . . . is the most suitable.

Hence, when values of the basic signal sampled at a consecutive timing are equal to each other, the equivalent signal EQU is at "H" level. The magnitude comparator 7d is used to realize this.

On the other hand, since the situation of FIG. 5 is evoked when two values of the basic signal sampled at every other timing are equal to each other, it is judged that the phase is lagged behind by 45°. Of these two values of the basic signal, if the value resulted by the early sampling is larger than the other, the situation corresponds to FIG. 6 where it is judged that there is a phase lag and the non-equivalent signal UPDN rises to "H" level. The purpose of providing the magnitude comparator 7e and an OR gate 9a is to realize this.

Thus, according to the fourth preferred embodiment, as in the NTSC method described earlier in relation to the first preferred embodiment, it is possible to automatically find an optimal sampling timing and control the phase of the sampling clock $\phi_2$ in the PAL method as well.

While the invention has been described in detail, the foregoing description is in all aspects illustrative and not restrictive. It is understood that numerous other modifications and variations can be devised without departing from the scope of the invention.

We claim:

1. A sampling circuit for sampling an analog signal-to-be-sampled using a sampling clock, said signal-to-be-sampled including a primary signal which is obtained by demodulating a carrier signal, and a fore signal which has a same frequency as said carrier signal and which is precedent to said primary signal, said sampling clock having a frequency which is m times as high as the frequency of said carrier signal (m is an integer), said sampling circuit comprising:

(a) an A/D converter for sampling said signal-to-be-sampled in accordance with said sampling clock and generating a digital basic signal;

(b) a phase reference detecting circuit for receiving the digital basic signal from the A/D converter and for generating at least three delayed basic signals having different phases from each other and being obtained by delaying said basic signal in synchronism with said sampling clock, and a phase reference signal which indicates a reference of a phase of said sampling clock;

(c) a phase difference detecting circuit for receiving the delayed signals from the phase reference detecting circuit and for generating a phase difference signal from said delayed basic signals, said phase difference signal indicating a phase difference between said fore signal and said basic signal when said phase reference signal is active; and (d) a sampling clock shifting circuit for receiving the phase difference signal from the phase difference detecting circuit and the phase reference signal from the phase reference detecting circuit and for shifting the phase of said sampling clock in accordance with said phase difference signal only when said phase reference signal is active, to thereby supply said sampling clock to said converter and said phase reference detecting circuit.

2. The sampling circuit of claim 1, wherein said phase reference signal is activated during a specified one cycle of said sampling clock which starts from a time of activation of said sampling clock within a range of ½m cycle from a mid value of said fore signal toward both a prior time and a future time.

3. The sampling circuit of claim 2, wherein said integer m is 4, and wherein said phase reference detecting circuit includes:

(b-1) first signal transmitting means having an input terminal for receiving said basic signal and an output terminal for transmitting a signal which is received at said input terminal in response to activation of said sampling clock as a first delayed basic signal of said delayed basic signals;

(b-2) second signal transmitting means having an input terminal for receiving said first delayed basic signal and an output terminal for transmitting a signal which is supplied to said input terminal of said second signal transmitting means in response to activation of said sampling clock as a second delayed basic signal of said delayed basic signals;

(b-3) third signal transmitting means having an input terminal for receiving said second delayed basic signal and an output terminal for transmitting a signal which is supplied to said input terminal of said third signal transmitting means in response to activation of said sampling clock as a third delayed basic signal of said delayed basic signals;

(b-4) fourth signal transmitting means having an input terminal for receiving said third delayed basic signal and an output terminal for transmitting a signal which is supplied to said input terminal of said fourth signal transmitting means in response to activation of said sampling clock as a fourth delayed basic signal of said delayed basic signals; and (b-5) a comparator for outputting said phase reference signal which is activated when said first delayed basic signal is smaller in delay than said fourth delayed basic signal and is equal to or smaller in delay than said second delayed basic signal during said specified one cycle of said fore signal.

4. The sampling circuit of claim 2, wherein said integer m is 4, and wherein said phase reference detecting circuit includes:

(b-1) first signal transmitting means having an input terminal for receiving said basic signal and an output terminal for transmitting a signal which is received at said input terminal in response to activation of said sampling clock as a first delayed basic signal of said delayed basic signals;

(b-2) second signal transmitting means having an input terminal for receiving said first delayed basic signal and an output terminal for transmitting a signal which is supplied to said input terminal of said second signal transmitting means in response to activation of said sampling clock as a second delayed basic signal of said delayed basic signals;

(b-3) third signal transmitting means having an input terminal for receiving second delayed basic signal and an output terminal for transmitting a signal which is supplied to said input terminal of said third signal transmitting means in response to activation of said sampling clock as a third delayed basic signal of said delayed basic signals;

(b-4) fourth signal transmitting means having an input terminal for receiving said third delayed basic signal and an output terminal for transmitting a signal which is supplied to said input terminal of said fourth signal transmitting means in response to activation of said sampling clock as a fourth delayed basic signal of said delayed basic signals; and (b-5) a comparator for outputting said phase reference signal which is activated when said fourth delayed basic signal is larger in delay than said first delayed basic signal and is equal to or smaller in delay than said third delayed basic signal during said specified one cycle of said fore signal.

5. The sampling circuit of claim 2, wherein said integer m is 4, and wherein said phase reference detecting circuit includes:

(b-1) first signal transmitting means having an input terminal for receiving said basic signal and an output terminal for transmitting a signal which is received at said input terminal in response to activation of said sampling clock as a first delayed basic signal of said delayed basic signals;

(b-2) second signal transmitting means having an input terminal for receiving said first delayed basic signal and an output terminal for transmitting a signal which is supplied to said input terminal of said second signal transmitting means in response to activation of said sampling clock as a second delayed basic signal of said delayed basic signals;

(b-3) third signal transmitting means having an input terminal for receiving said second delayed basic signal and an output terminal for transmitting a signal which is supplied to said input terminal of said third signal transmitting means in response to activation of said sampling clock as a third delayed basic signal of said delayed basic signals; and (b-4) a first comparator for outputting said phase reference signal which is activated when said second delayed basic signal is larger in delay than said first delayed basic signal and said third delayed basic signal is equal to or smaller in delay than said second delayed basic signal during said specified one cycle of said fore signal.

6. The sampling circuit of claim 5, wherein said phase difference detecting circuit includes (c-1) a second comparator for comparing said third and said first delayed basic signals and for outputting an equivalent signal which is activated when said third and said first delayed basic signals are equal in delay to each other and a non-equivalent signal which is activated when said third delayed basic signal is larger in delay than said first delayed basic signal, and wherein said equivalent signal and said non-equivalent signal form said phase difference signal.

7. The sampling circuit of claim 5, wherein said phase difference detecting circuit includes:

(c-1) a second comparator for outputting an equivalent signal which is activated when said third and said second delayed basic signals are in delay equal to each other; and (c-2) a third comparator for outputting a non-equivalent signal which is activated when said third delayed basic signal is equal in delay to or larger than said first delayed basic signal, and wherein said equivalent signal and said non-equivalent signal form said phase difference signal.

8. The sampling circuit of claim 2, wherein said phase difference signal is formed by an equivalent signal which is activated when said. signal-to-be-sampled is sampled at an optimal timing and a non-equivalent signal which indicates, during activation of said phase reference signal, that the activation expresses a timing delay of sampling, and wherein said sampling clock shifting circuit includes:

(d-1) delaying means for receiving a shifting control signal and said sampling clock and delaying said sampling clock in accordance with said shifting control signal;

(d-2) a counter for counting said sampling clock which is delayed by said delaying means and generating said shifting control signal, a direction in which said counter counts being determined by said non-equivalent signal; and (d-3) counter operation allowing means for allowing said counter to count only when said non-equivalent signal is not active but said phase reference signal is active.

9. The sampling circuit of claim 8, wherein said delaying means includes:

(d-1-1) a plurality of delaying elements which are serially connected to each other;

(d-1-2) the same number of input terminals as said plurality of said delaying elements, each receiving an output of an associated one of said delaying elements; and (d-1-3) a selector for selectively outputting one of data supplied to said input terminals in accordance with said shifting control signal.

10. The sampling circuit of claim 8, wherein said counter includes (d-2-1) an enable terminal for controlling an operation of said counter, and wherein said counter operation allowing means includes:

(d-3-1) an inverter for reversing said equivalent signal; and (d-3-2) a logic element having an input terminal for receiving an output of said inverter and said phase reference signal and an output terminal for outputting a logical product which is obtained at said input terminal of said logic element, said, output terminal of said logic element being connected to said enable terminal.

11. The sampling circuit of claim 8, wherein said sampling clock shifting circuit further includes (d-4) counting direction reversing means for reversing a counting direction when said counter registers a maximum count or a minimum count.

12. The sampling circuit of claim 11, wherein said counter outputs a carry-out signal which is activated when said counter registers said maximum count or said minimum count, and wherein said counting direction reversing means includes:

(d-4-1) a flip-flop for outputting a reversing control signal which is set by said carry-out signal and reset by said equivalent signal; and (d-4-2) a logic element for transmitting said non-equivalent signal in response to deactivation of said reversing control signal and for reversing and transmitting said non-equivalent signal in response to activation of said reversing control signal.

13. The sampling circuit of claim 11, wherein said delaying means shifts said sampling clock within a range of ⅜ cycle of said fore signal.

14. The sampling circuit of claim 11, wherein said sampling clock shifting circuit further includes (d-5) counting stopping means for prohibiting counting up when said counter registers said maximum count and prohibiting counting down when said counter registers said minimum count.

15. A phase reference detecting circuit for generating a basic signal by sampling a signal-to-be-sampled in accordance with a sampling clock which is activated at intervals of a specified ¼ cycle of said signal-to-be-sampled and for outputting a phase reference signal which serves as a reference to determine whether said signal-to-be-sampled is sampled with a predetermined phase and which is activated in response to said basic signal, said phase reference detecting circuit comprising:

(a) first signal transmitting means having an input terminal for receiving said basic signal and an output terminal for transmitting a signal which is received at said input terminal in response to activation of said sampling clock, said signal from said output terminal being outputted as a first delayed basic signal;

(b) second signal transmitting means having an input terminal for receiving said first delayed basic signal and an output terminal for transmitting a signal which is supplied to said input terminal of said second signal transmitting means in response to activation of said sampling clock, said signal from said output terminal being outputted as a second delayed basic signal;

(c) third signal transmitting means having an input terminal for receiving said second delayed basic signal and an output terminal for transmitting a signal which is supplied to said input terminal of said third signal transmitting means in response to activation of said sampling clock, said signal from said output terminal being outputted as a third delayed basic signal; and (d) a first comparator for receiving the first, second, and third delayed basic signals and for outputting said phase reference signal which is activated when said second delayed basic signal is larger in delay than said first delayed basic signal and said third delayed basic signal is equal to or smaller in delay than said second delayed basic signal during said specified cycle of said fore signal.

16. A sampling clock shifting circuit for shifting a phase of a sampling clock during sampling of a signal-to-be-sampled in accordance with said sampling clock which is activated at intervals of ¼ cycle of said signal-to-be-sampled in such a manner that said signal-to-be-sampled is sampled with a predetermined phase, said sampling clock shifting circuit receiving:

(x-1) a coincidence signal which indicates whether a phase of said sampling clock is deviated from said predetermined phase;

(x-2) a phase reference signal which expresses a deviation between the phase of said sampling clock and said predetermined phase; and (x-3) a non-coincidence signal which expresses a direction of the deviation between the phase of said sampling clock and said predetermined phase when said phase reference signal is active, said sampling clock shifting circuit comprising:

(a) delaying means for receiving a shifting control signal and said sampling clock and delaying said sampling clock in accordance with said shifting control signal;

(b) a counter for counting said sampling clock which is delayed by said delaying means and generating said shifting control signal, a direction in which said counter counts being determined by said non-coincidence signal; and (c) counter operation allowing means for allowing said counter to count only when said coincident signal is not active but said phase reference signal is active.

* * * * *